United States Patent
Starodoubov et al.

(10) Patent No.: US 9,797,498 B2
(45) Date of Patent: Oct. 24, 2017

(54) ISOLATOR WITH DOUBLE ACTING SPRING SYSTEM WITH REDUCED NOISE

(71) Applicant: Litens Automotive Partnership, Woodbridge (CA)

(72) Inventors: Vladimir I. Starodoubov, North York (CA); John Antchak, Aurora (CA); Andrew M. Boyes, Aurora (CA); Boris Replete, Toronto (CA)

(73) Assignee: LITENS AUTOMOTIVE PARTNERSHIP, Woodbridge, ON (CA)

( * ) Notice: Subject to any disclaimer, the term of this patent is extended or adjusted under 35 U.S.C. 154(b) by 155 days.

(21) Appl. No.: 14/893,222

(22) PCT Filed: May 23, 2014

(86) PCT No.: PCT/CA2014/000456
§ 371 (c)(1),
(2) Date: Nov. 23, 2015

(87) PCT Pub. No.: WO2014/186876
PCT Pub. Date: Nov. 27, 2014

(65) Prior Publication Data
US 2016/0123453 A1    May 5, 2016

Related U.S. Application Data

(60) Provisional application No. 61/826,492, filed on May 23, 2013.

(51) Int. Cl.
*F16H 55/36* (2006.01)
*B60K 25/02* (2006.01)
(Continued)

(52) U.S. Cl.
CPC .............. *F16H 55/36* (2013.01); *B60K 25/02* (2013.01); *F02B 67/06* (2013.01); *F16D 3/12* (2013.01);
(Continued)

(58) Field of Classification Search
CPC ........... F16H 55/36; F16H 7/18; B60K 25/02; B60Y 2300/58; F02B 67/06; F16D 3/12; F16D 3/66
See application file for complete search history.

(56) References Cited

U.S. PATENT DOCUMENTS 3,556,273 A    1/1971 Marcher
3,666,021 A    5/1972 Whitehouse
(Continued)

FOREIGN PATENT DOCUMENTS

CA    2753767 A1    9/2010
CA    2802116 A1    12/2011
(Continued)

OTHER PUBLICATIONS

International Preliminary Report on Patentability for PCT/CA2013/000881 dated Apr. 15, 2015.
(Continued)

*Primary Examiner* — William E Dondero
*Assistant Examiner* — Robert T Reese
(74) *Attorney, Agent, or Firm* — Millman IP, Inc.

(57) ABSTRACT

An isolator is provided for use with an engine and in particular an engine that is assisted or started by MGU (Motor-Generator Unit) or a motor through an endless drive member. It comprises a double acting spring system for isolating crankshaft pulley from torsion vibration at the crankshaft, and in extreme conditions, such as during engine startup and accelerations or decelerations of the engine crankshaft relative to the pulley and when isolator operates (Continued)

US 9,797,498 B2

Page 2 in an "engine-driven" mode with the engine crankshaft is driven by the belt.

17 Claims, 34 Drawing Sheets

(51) Int. Cl.
F02B 67/06 (2006.01)
F16D 3/12 (2006.01)
F16H 7/18 (2006.01)
F16D 3/66 (2006.01)

(52) U.S. Cl.
CPC ............... *F16D 3/66* (2013.01); *F16H 7/18* (2013.01); *B60Y 2300/58* (2013.01); *F16H 2055/366* (2013.01)

(56) References Cited

U.S. PATENT DOCUMENTS

| | | | |
|---|---|---|---|
| 4,092,837 A | 6/1978 | Gebauer et al. | |
| 4,483,685 A | 11/1984 | Spasiano et al. | |
| 4,591,868 A | 5/1986 | Cusey et al. | |
| 4,690,256 A | 9/1987 | Bopp et al. | |
| 5,048,657 A | 9/1991 | Dissett et al. | |
| 5,380,248 A * | 1/1995 | Kraus | F16F 15/1343 464/66.1 |
| 5,893,355 A | 4/1999 | Glover et al. | |
| 5,964,674 A | 10/1999 | Serkh et al. | |
| 6,044,943 A | 4/2000 | Byztek et al. | |
| 6,083,130 A | 7/2000 | Mevissen et al. | |
| 6,113,496 A * | 9/2000 | Oyama | F16F 15/13142 192/213.2 |
| 6,131,487 A | 10/2000 | Jackel et al. | |
| 6,244,577 B1 | 6/2001 | Bucholtz | |
| 6,712,706 B2 | 3/2004 | Jackel et al. | |
| 7,153,227 B2 | 12/2006 | Dell et al. | |
| 7,204,772 B2 | 4/2007 | Huber | |
| 7,207,910 B2 | 4/2007 | Dell et al. | |
| 7,217,204 B2 | 5/2007 | Roby | |
| 7,510,062 B2 | 3/2009 | Derr | |
| 7,624,852 B2 | 12/2009 | Mevissen et al. | |
| 7,708,661 B2 | 5/2010 | Pflug et al. | |
| 7,878,315 B2 | 2/2011 | Saito et al. | |
| 7,891,475 B2 | 2/2011 | Zhu et al. | |
| 7,892,124 B2 | 2/2011 | Hodjat et al. | |
| 7,954,613 B2 | 6/2011 | Mevissen et al. | |
| 8,021,253 B2 | 9/2011 | Dell et al. | |
| 8,028,602 B2 | 10/2011 | Crist | |
| 8,038,554 B2 | 10/2011 | Watanabe et al. | |
| 8,192,312 B2 | 6/2012 | Ali et al. | |
| 8,276,720 B2 | 10/2012 | Farahati et al. | |
| 8,313,400 B2 | 11/2012 | Serkh et al. | |
| 8,419,574 B2 | 4/2013 | Serkh et al. | |
| 8,863,892 B2 * | 10/2014 | Kombowski | G10K 11/002 181/207 |
| 9,194,438 B2 * | 11/2015 | Dell | F16F 15/1232 |
| 2002/0019263 A1 * | 2/2002 | Jackel | F16F 15/1343 464/67.1 |
| 2004/0014540 A1 | 1/2004 | Dell et al. | |
| 2004/0226393 A1 | 11/2004 | Hong | |
| 2006/0122014 A1 | 6/2006 | Kamdem | |
| 2006/0172832 A1 | 8/2006 | Watababe et al. | |
| 2006/0264280 A1 | 11/2006 | Dell et al. | |
| 2008/0139351 A1 | 6/2008 | Pflug et al. | |
| 2008/0312014 A1 | 12/2008 | Stief et al. | |
| 2009/0022377 A1 | 1/2009 | Matsue et al. | |
| 2009/0107791 A1 | 4/2009 | Zhu et al. | |
| 2009/0121401 A1 * | 5/2009 | Lehmann | F16D 3/66 267/215 |
| 2009/0176583 A1 | 7/2009 | Dell et al. | |
| 2009/0194380 A1 | 8/2009 | Ali et al. | |
| 2009/0223775 A1 | 9/2009 | Hodjat et al. | |
| 2010/0032258 A1 | 2/2010 | Mevissen et al. | |
| 2010/0099527 A1 | 4/2010 | Rolando | |
| 2010/0120563 A1 | 5/2010 | Serkh et al. | |
| 2010/0167856 A1 * | 7/2010 | Hartmann | F02B 63/04 474/94 |
| 2010/0187066 A1 * | 7/2010 | Kneidel | F16D 3/12 192/203 |
| 2011/0245000 A1 | 10/2011 | Serkh et al. | |
| 2011/0256968 A1 | 10/2011 | Serkh et al. | |
| 2011/0315502 A1 * | 12/2011 | Antchak | F16D 7/022 192/75 |
| 2012/0015768 A1 | 1/2012 | Serkh et al. | |
| 2012/0088616 A1 | 4/2012 | Ali et al. | |
| 2012/0094791 A1 | 4/2012 | Lee | |
| 2012/0149511 A1 | 6/2012 | Hodjat | |
| 2013/0098733 A1 | 4/2013 | Antchak et al. | |
| 2016/0201757 A1 * | 7/2016 | Tran | B60K 25/02 474/94 |

FOREIGN PATENT DOCUMENTS

| | | |
|---|---|---|
| CN | 101275612 A | 10/2008 |
| CN | 102341610 A | 2/2012 |
| DE | 21202 | 4/1961 |
| DE | 19730001 A1 | 1/1999 |
| DE | 19912970 A1 | 9/1999 |
| DE | 19919449 A1 | 11/1999 |
| DE | 102005016897 A1 | 10/2006 |
| DE | 102005062318 A1 | 7/2007 |
| DE | 102006039362 A1 | 3/2008 |
| DE | 102007058018 A1 | 7/2008 |
| DE | 102008059263 A1 | 6/2009 |
| DE | 102009039989 A1 | 4/2010 |
| DE | 102010023714 A1 | 1/2011 |
| EP | 0349267 A1 | 6/1989 |
| EP | 0934843 B1 | 5/2004 |
| EP | 1645783 A1 | 4/2006 |
| EP | 1662161 A1 | 5/2006 |
| EP | 1710465 A1 | 10/2006 |
| EP | 1621796 B1 | 10/2007 |
| EP | 2148109 A1 | 1/2010 |
| EP | 2255100 A1 | 12/2010 |
| EP | 2235400 A4 | 6/2011 |
| EP | 01621796 B2 | 10/2011 |
| EP | 2203655 B1 | 3/2012 |
| EP | 2638304 A1 | 9/2013 |
| EP | 2556274 B1 | 5/2014 |
| EP | 2010792 B1 | 3/2015 |
| GB | 2308173 A | 6/1997 |
| KR | 1020110131197 A | 12/2011 |
| WO | 9110075 A1 | 7/1991 |
| WO | 9612122 A1 | 4/1996 |
| WO | 9821062 A1 | 5/1998 |
| WO | 03046407 A1 | 6/2003 |
| WO | 2005005865 A1 | 1/2005 |
| WO | 2005028899 A1 | 3/2005 |
| WO | 2007074016 A1 | 7/2007 |
| WO | 2007077414 A1 | 7/2007 |
| WO | 2007077415 A1 | 7/2007 |
| WO | 2007121582 A1 | 11/2007 |
| WO | 2008022897 A1 | 2/2008 |
| WO | 2008049388 A2 | 5/2008 |
| WO | 2008058499 A2 | 5/2008 |
| WO | 2008067915 A1 | 6/2008 |
| WO | 2008071306 A1 | 6/2008 |
| WO | 2009099504 A2 | 8/2009 |
| WO | 2009111036 A1 | 9/2009 |
| WO | 2010005880 A1 | 1/2010 |
| WO | 2010099605 A1 | 9/2010 |
| WO | 2011126916 A1 | 10/2011 |
| WO | 2011130106 A1 | 10/2011 |
| WO | 2011160215 A1 | 12/2011 |
| WO | 2012009314 A1 | 1/2012 |
| WO | 2012061930 A1 | 5/2012 |
| WO | 2012082479 A1 | 6/2012 |

(56) References Cited

FOREIGN PATENT DOCUMENTS

WO           2013033825 A1     3/2013
WO           2014186876 A1     11/2014

OTHER PUBLICATIONS

English translation of Office Action for CN201380053505.8 dated Apr. 12, 2016.
International Search Report for PCT/CA2013/000881 dated Jan. 28, 2014.
Office Action for CN201380053505.8 dated Apr. 12, 2016.
Office Action for U.S. Appl. No. 14/470,937 dated Jan. 29, 2016.
ISR & WO for PCT/CA2014/000592 dated Oct. 29, 2014.
Installation Instructions for KPMI Part No. 90-9034 BMW (Lightweight Racing Vale Spring Kit), 1970, Kibblewhite Precision Machining, Inc.
International Search Report and Written Opinion for PCT/CA2014/000456, Sep. 3, 2014, ISA.
Office Action for CN201480041438.2 dated Mar. 2, 2017.
Office Action for CN201480041438.2 dated Mar. 2, 2017—English translation.
Reporting letter for Office Action for CN201480041438.2 dated Mar. 28, 2017.
Extend European search report for EP3025072 dated Feb. 17, 2017.
Office Action for CN201380053505.8 dated Feb. 23, 2017.
Office Action for CN201380053505.8 dated Feb. 23, 2017, English translation.

* cited by examiner

ISOLATOR WITH DOUBLE ACTING SPRING SYSTEM WITH REDUCED NOISE

CROSS-REFERENCE TO RELATED APPLICATIONS

This application claims the benefit of U.S. Provisional Patent Application No. 61/826,492, filed May 23, 2013, the contents of which are incorporated by reference as if fully set forth in detail herein.

FIELD OF THE INVENTION

The present invention relates to isolators and in particular isolators that are used between the engine crankshaft and endless drive member in vehicles in which the engine can be started or assisted by the endless drive member (e.g. an engine equipped with a belt-alternator start (BAS) drive system).

BACKGROUND OF THE INVENTION

Isolators are usually used for isolating crankshaft pulley from torsion vibration at the crankshaft that is a result of vibration in torque that occurs in internal combustion engines and in particular those with certain cylinder counts such as four-or-three cylinder engines, and diesel engines, and they are also used in extreme conditions, such as during the engine startup and accelerations or decelerations of the engine crankshaft relative to the pulley. In addition isolators can operate in an "engine-driven" mode with the engine crankshaft is driven by the belt.

SUMMARY

In an aspect, the present disclosure provides an improved isolator for isolating of the torque vibration between crankshaft and an endless drive member in vehicles in which the engine can be started or assisted by the endless drive member. This isolator comprises a double acting spring system. The spring system is mounted in the spring tray, built from low friction material, and fixed to a pulley. The pulley has a bearing and is mounted on the hub and is thus centered on the crankshaft. The spring tray has two travel stops that are located in the diametrical opposite sides. The double acting spring system includes two arc compression springs that are located between two stops of the spring tray without preload. The ends of the springs are fixed on the pins mounted on the plastic guides. They have ability to move and compress the arc springs using symmetrical arms of the pivotable driver. The pivotable driver is coaxially fixed to the crankshaft. In spring balancing position the symmetrical arms of the driver remain balanced between the guides and the travel stops. The section width of the arms of the pivotable driver is greater than the corresponding width of the travel stops, which allows the driver passing through a neutral position without impact of the guides on the travel stops and changing of the springs compression direction.

In another aspect, an isolator is provided, comprising a spring, a shaft adapter and a pulley. The spring has a first spring end and a second spring end. The shaft adapter is mountable to a crankshaft for rotation about an axis. The shaft adapter has a first adapter drive surface that is engageable with the first spring end and a second adapter drive surface that is angularly spaced from the first adapter drive surface by an adapter drive surface spacing and that is engageable with the second spring end. The pulley is engageable with an endless drive member and is rotatable relative to the shaft adapter. The pulley has a first pulley drive surface that is engageable with the first spring end and a second pulley drive surface that is angularly spaced from the first pulley drive surface by a pulley drive surface spacing and that is engageable with the second spring end. Torque is transferable from the shaft adapter to the spring through the first spring end, and from the spring to the pulley through the second spring end. Torque is transferable from the pulley to the spring through the first spring end, and from the spring to the shaft adapter through the second spring end. One of the adapter and pulley drive surface spacings is larger than the other of the adapter and pulley drive surface spacings. When transitioning from torque transfer from the shaft adapter to the pulley to torque transfer from the pulley to the shaft adapter, the second adapter drive surface engages the second spring end at a different time than the first adapter drive surface disengages from the first spring end, and the second pulley drive surface disengages from the second spring end at a different time than the first pulley drive surface engages the first spring end. Wherein when transitioning from torque transfer from the pulley to the shaft adapter to torque transfer from the shaft adapter to the pulley the first adapter drive surface engages the first spring end at a different time than the second adapter drive surface disengages from the second spring end, and the first pulley drive surface disengages from the first spring end at a different time than the second pulley drive surface engages the second spring end.

In another aspect, an isolator is provided, comprising a spring, a shaft adapter and a pulley. The spring has a first spring end and a second spring end. The shaft adapter is mountable to a crankshaft for rotation about an axis, wherein the shaft adapter has a first adapter drive surface that is engageable with the first spring end and a second adapter drive surface that is angularly spaced from the first adapter drive surface and that is engageable with the second spring end. The pulley is engageable with an endless drive member and that is rotatable relative to the shaft adapter. The pulley has a first pulley drive surface that is engageable with the first spring end and a second pulley drive surface that is angularly spaced from the first pulley drive surface and that is engageable with the second spring end. Torque is transferable from the shaft adapter to the spring through the first spring end, and from the spring to the pulley through the second spring end. Torque is transferable from the pulley to the spring through the first spring end, and from the spring to the shaft adapter through the second spring end. When the isolator is at rest, the adapter and pulley drive surfaces are configured have positions relative to one another that are selected based on a moment of inertia of the pulley and a moment of inertia of the shaft adapter, based on a maximum torque to be transferred therebetween, and based on a material of the adapter drive surfaces and a material of the pulley drive surfaces, such that when transitioning from torque transfer from the shaft adapter to the pulley to torque transfer from the pulley to the shaft adapter, the second adapter drive surface engages the second spring end with a first kinetic energy and at a different time than the first adapter drive surface disengages from the first spring end, and the second pulley drive surface disengages from the second spring end with a second kinetic energy and at a different time than the first pulley drive surface engages the first spring end, and such that when transitioning from torque transfer from the pulley to the shaft adapter to torque transfer from the shaft adapter to the pulley the first adapter drive surface engages the first spring end with a third kinetic energy and at a different time than the second adapter drive surface disengages from the second spring end, and the first pulley drive surface disengages from the first spring end with a fourth kinetic energy and at a different time than the second pulley drive surface engages the second spring end. The first, second, third and fourth kinetic energies are less than a selected value.

Other features and advantages will be apparent by following the description with references to the drawings.

BRIEF DESCRIPTION ON THE DRAWINGS

DETAILED DESCRIPTION

Figure 1:
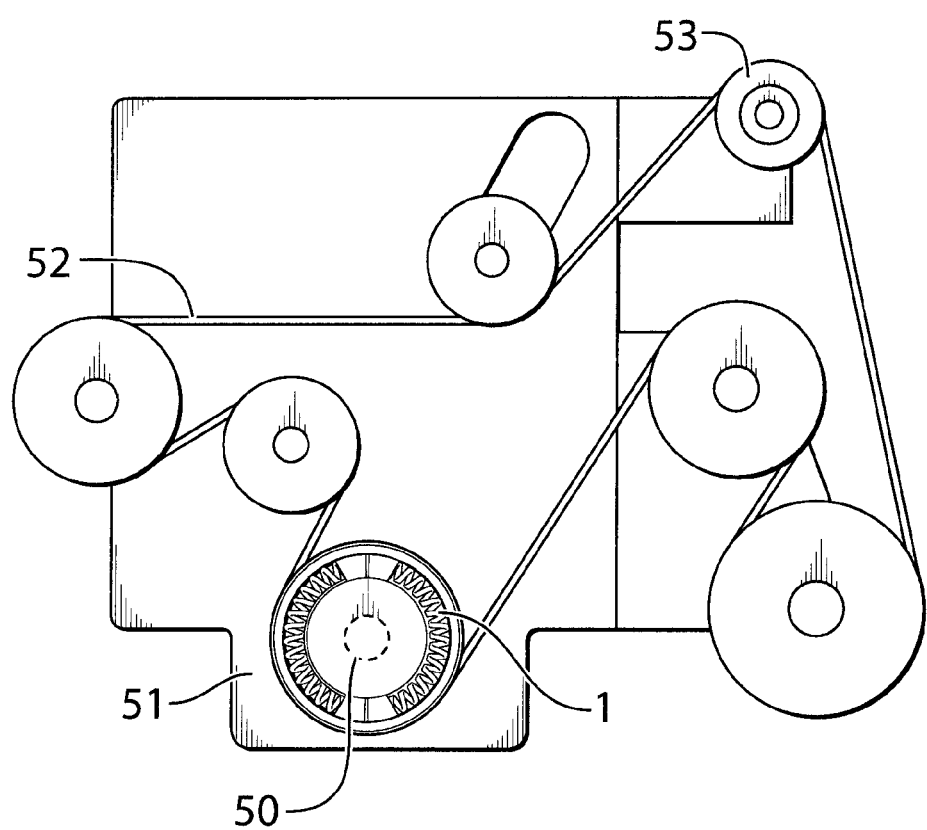
FIG. 1 is an elevation view of an engine with a crankshaft, a driven belt and an isolator in accordance with an embodiment of the present invention.

Reference is made to FIG. 1, which shows an isolator 1 for transferring power between a crankshaft 50 on an engine 51 and an endless drive member 52, such as an accessory drive belt, in accordance with an embodiment of the present invention. The isolator 1 isolates the endless drive member 52 from vibrations or other sudden changes in torque in the crankshaft 50, and vice versa.

The isolator 1 is useful in any engine, but is particularly useful in an engine that incorporates a BAS (belt-alternator start) system, in which the engine 51 is initially started normally (e.g. using a starter motor) but is shut down for brief periods (e.g. while the vehicle is at a stoplight) and then restarted by driving the crankshaft via the belt 52. The belt 52 would be driven by a separate motor (e.g. an electric motor) that is engaged with the belt 52 via a pulley, or by using an MGU (shown at 53) that would replace the alternator. Such systems are becoming increasingly common in an effort to increase fuel economy of vehicles and reduce emissions.

Figure 1A:
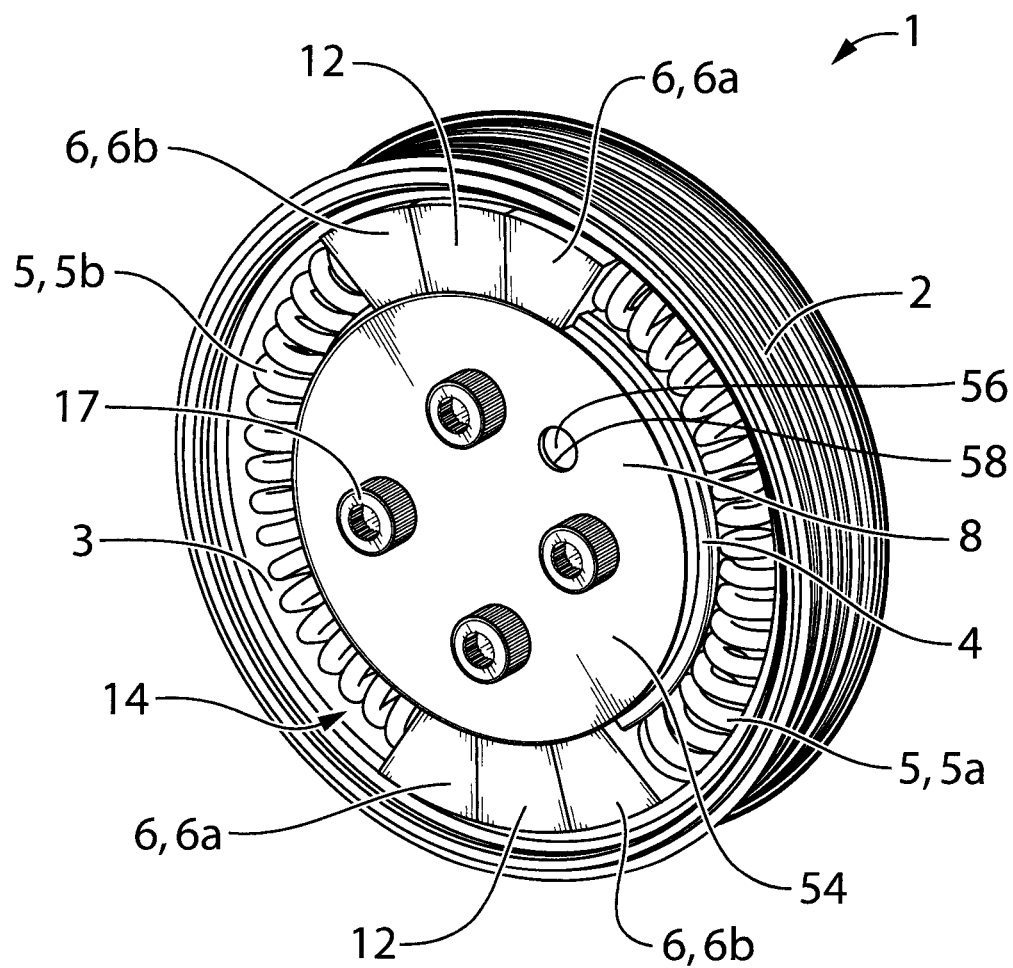
FIG. 1a is a perspective right-side view of the isolator shown in FIG. 1 with a double acting spring system with two springs.

As seen in FIG. 1a, the isolator 1 includes a pulley 2, a shaft adapter 54 and two springs 5. The two springs 5 are shown individually at 5a and 5b. Each spring 5 has a first end 40 and a second end 42. The springs 5 elastically deform to isolate the endless drive member 52 and the crankshaft 50 from vibrations or other sudden changes in torque in one another. The springs 5 in the examples shown are arcuate, helical coil compression springs. However, any other suitable type of springs could be used, such as, for example, arcuate closed cell foam springs.

Figure 2:
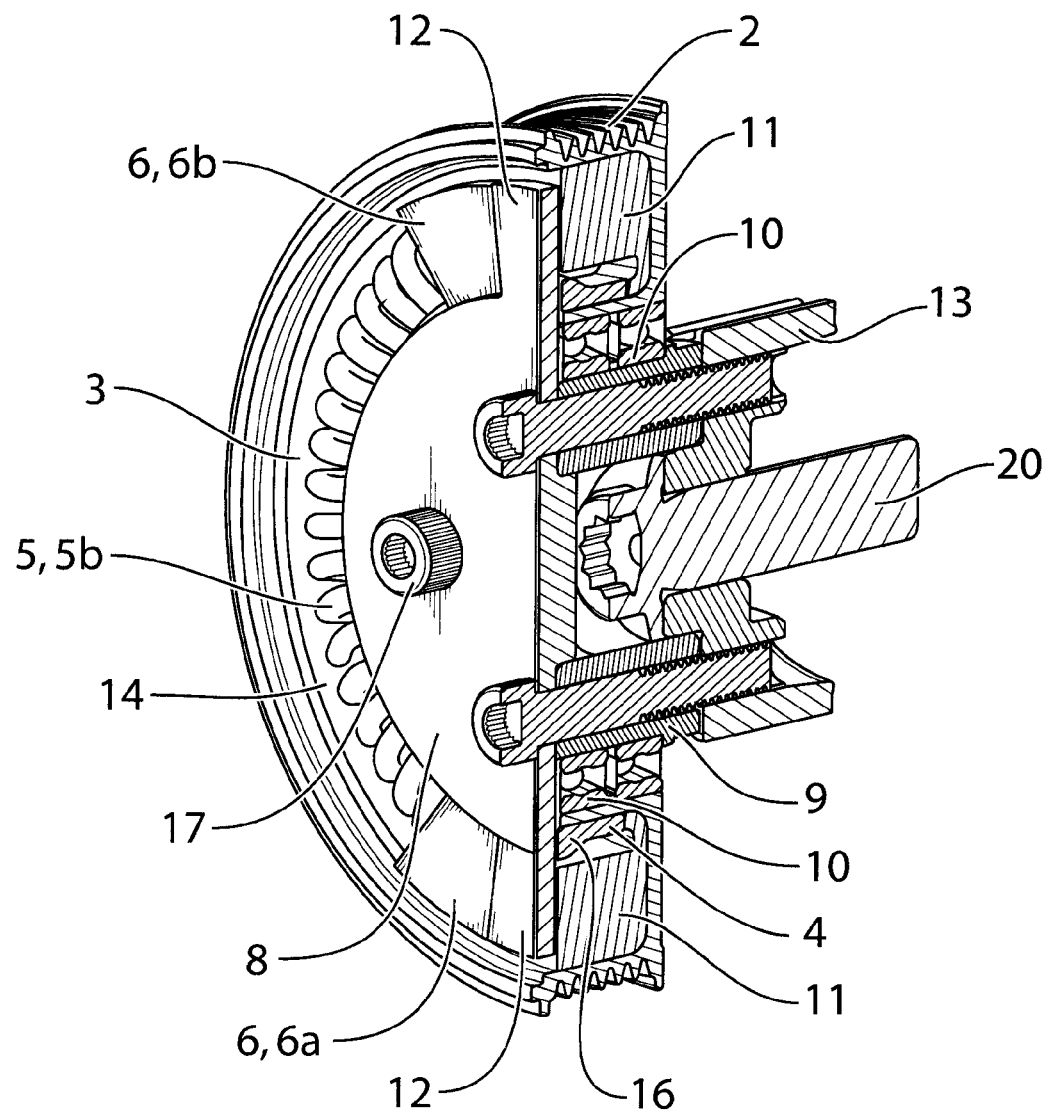
FIG. 2 is a perspective of longitudinal cross-section view of isolator in the springs balancing position.
Figure 3:
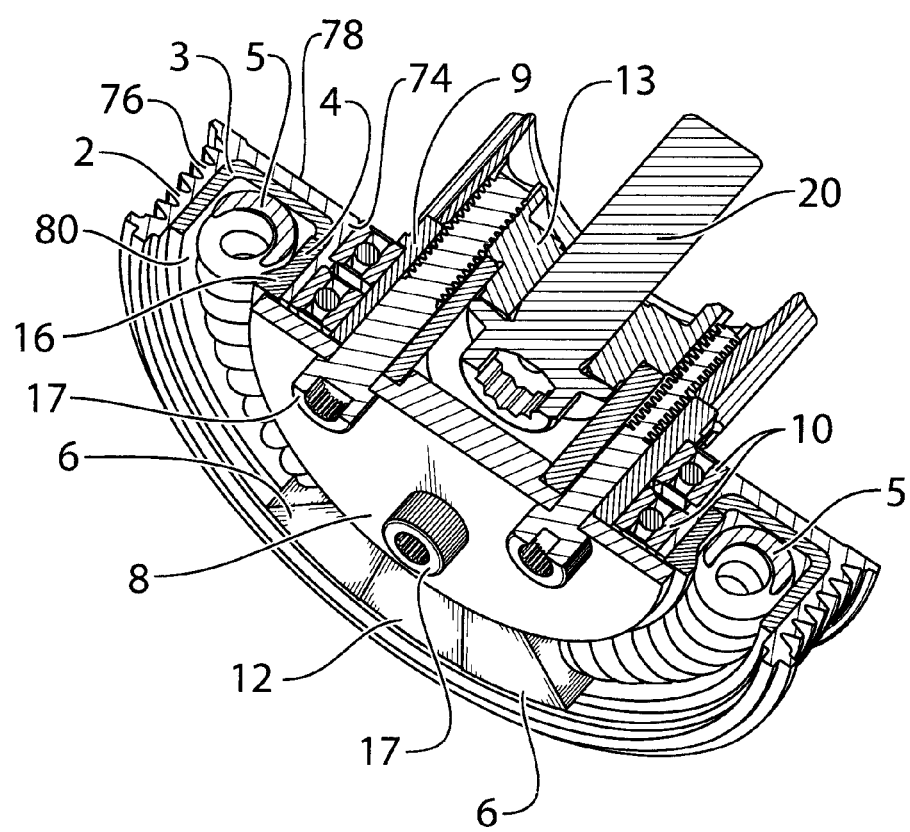
FIG. 3 is a perspective of longitudinal cross-section view of isolator with double acting spring system.
Figure 11:
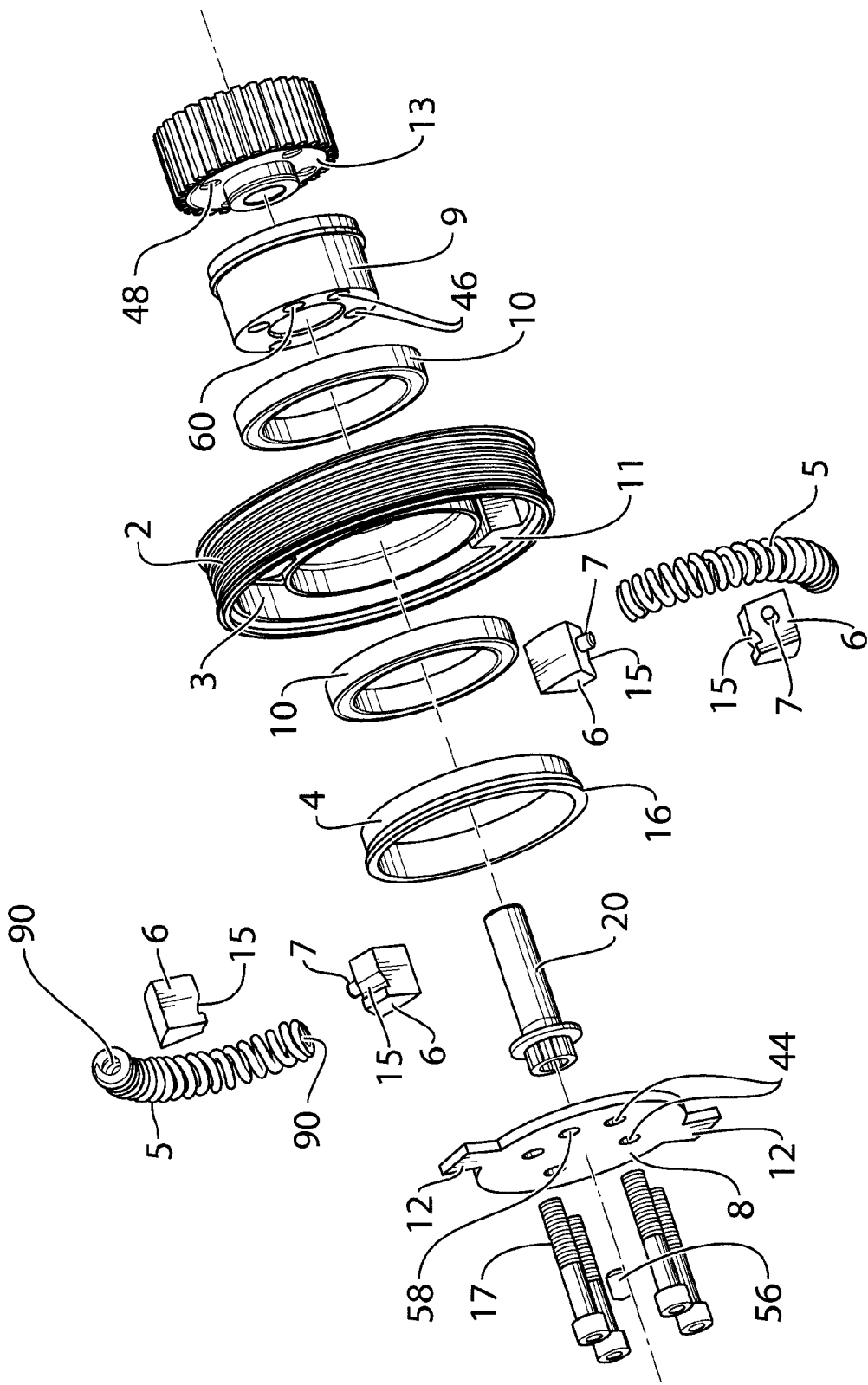
FIG. 11 is an exploded view of isolator with double acting spring system.
Figure 12:
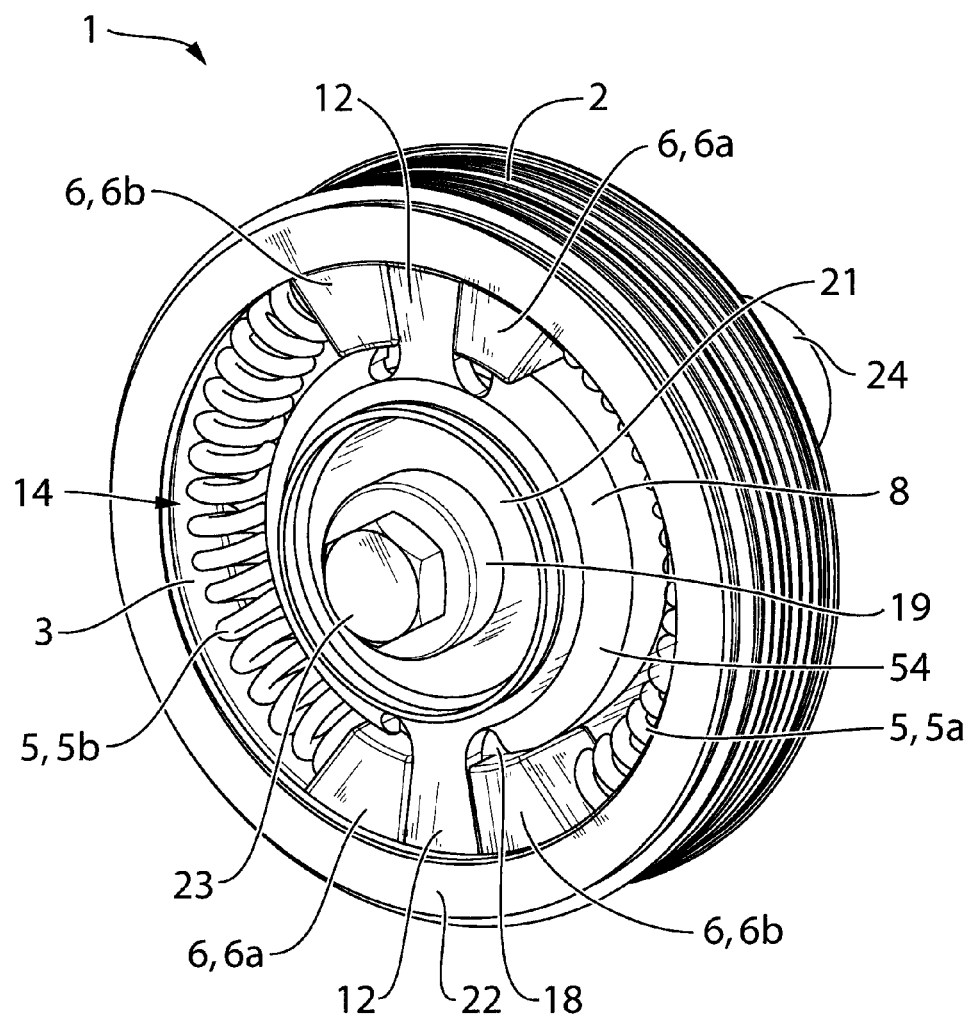
FIG. 12 is a perspective right-side view of isolator with double acting spring system, as a variant of embodiment of the invention.

Referring to FIGS. 2, 3 and 11, the shaft adapter 54 is fixedly mountable in any suitable way to the crankshaft 50 for rotation about an axis A. For example, the crankshaft 50 may include a crankshaft end 13 that mounts to the rest of the crankshaft 50 via of a threaded fastener 20 such as a spline socket head cap screw. The shaft adapter 54 may include a hub 9 that abuts a shoulder on the crankshaft end 13 in surrounding relationship to an axial projection 55 so as to align the hub 9 about the axis A, and a driver 8 that abuts an axial end face of the hub 9. A plurality of splined socket head cap screws (in this example, there are four) 17 pass through apertures 44 in the driver 8, and apertures 46 in the hub 9, and pass into aperture 48 in the crankshaft end 13 to hold the driver 8 and the hub 9 to the crankshaft 50. A dowel pin 56 is pressed through an aperture 58 in the driver and into a corresponding aperture 60 (FIG. 11) in the hub 9 to cause alignment of the driver 8 with the axis A.

Figure 4:
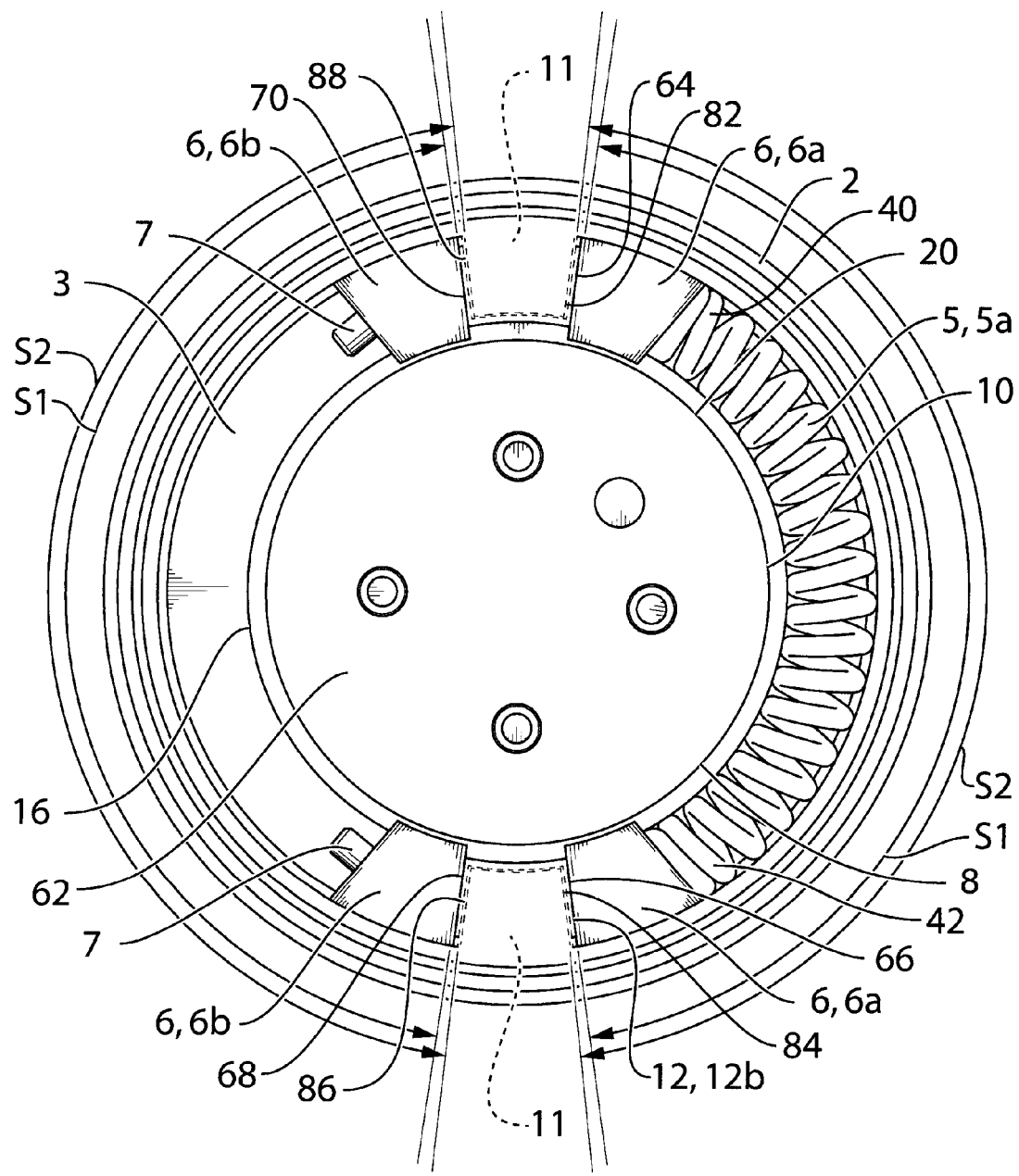
FIG. 4 is a front view of isolator with double acting spring system excluding the pivotable driver and left spring.
Figure 5:
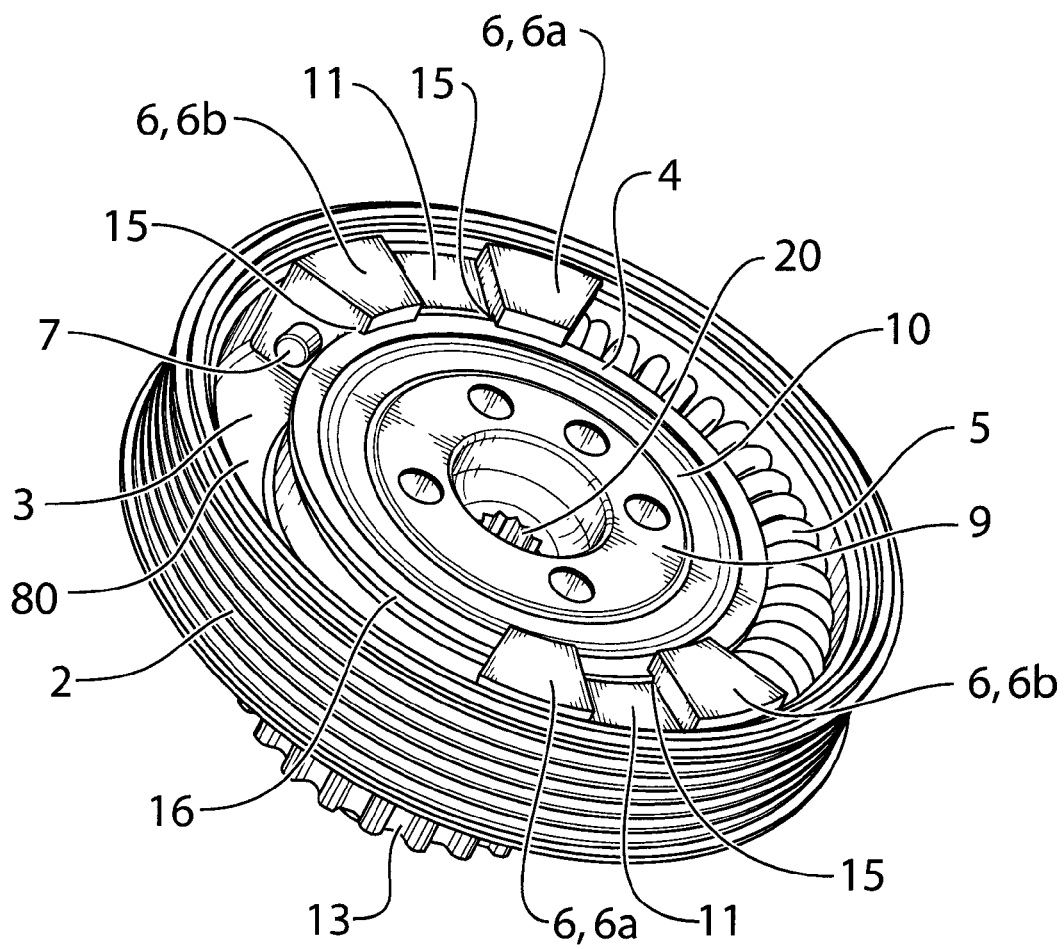
FIG. 5 is a perspective right-side view of isolator with double acting spring system excluding the driver and left spring.
Figure 6:
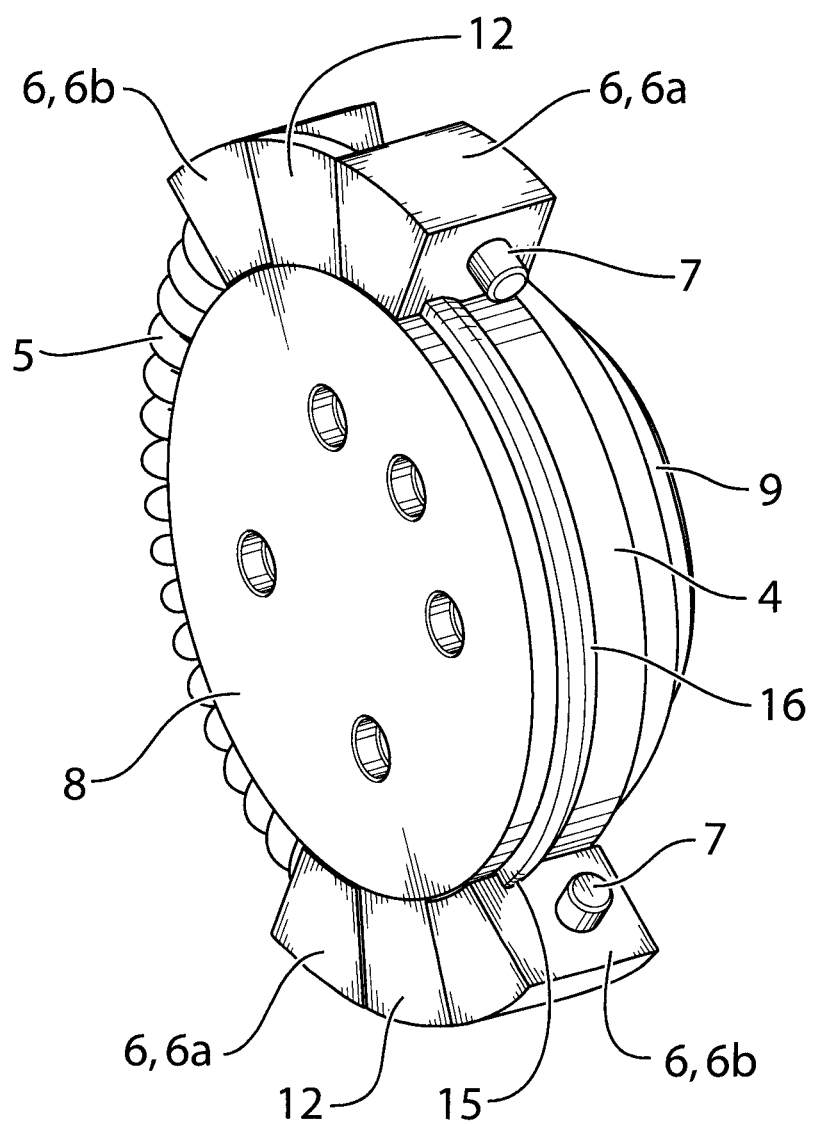
FIG. 6 is a detail perspective right-side view of isolator with double acting spring system.

Referring to FIG. 4, the driver 8 has a central body 62, a first arm 12a and a second arm 12b. The driver 8 has a first adapter drive surface 64 on one side of the first arm 12a, which is engageable with the first spring end 40 of the first spring 5a and a second adapter drive surface 66 on one side of the second arm 12b, which is angularly spaced from the first adapter drive surface 64 by an adapter drive surface spacing S1, and which is engageable with the second spring end 42 of the first spring 5a. The driver 8 has another first adapter drive surface 68 on another side of the second arm 12b, which is engageable with the first spring end 40 of the second spring 5b and a second adapter drive surface 70 on another side of the first arm 12a, which is angularly spaced from the first adapter drive surface 68 (also by the spacing S1) and which is engageable with the second spring end 42 of the second spring 5b.

In the embodiment shown, the driver 8 is generally planar but for a raised center portion 72 that is thicker than the remaining portion so as to impart strength and resistance to elongation of the apertures 44 and 58.

The driver 8 may be made from any suitable material such as a suitable steel.

The pulley 2 is engageable with the endless drive member 52 and is rotatably mounted to the shaft adapter 54 so that the pulley 2 is rotatable relative to the shaft adapter 54. The rotatable mounting of the pulley 2 to the shaft adapter 54 may be by any suitable means. For example, the pulley 2 may be mounted to one or more bearings 10 (in this example there are two bearings 10) which are themselves mounted to the outer surface of the hub 9.

The pulley 2 has an inner pulley portion 74 that is rotatably mounted to the shaft adapter 54 via the bearings 10, an outer pulley portion 76 that is engageable with the endless drive member 52, and a web 78 that connects the inner and outer portions 74 and 76. The web 78 and the outer portion 76, (and, in this example, the inner portion 74) together in part define a spring chamber 80 in which each spring 5 is held. In the example shown there are two spring chambers 80, each one holding one of the springs 5. The pulley 2 may be made from steel or some other suitable material.

A spring engagement lining 3 is provided on at least the surfaces of the web 78 and outer portion 76 that define the spring chamber 80 and is configured to support the springs 5 and to permit sliding of the springs 5 thereon with relatively little friction. The spring engagement lining 3 may be polymeric and may, for example, be made from nylon impregnated with PTFE, or from some other suitable material. In embodiments wherein the spring engagement lining 3 is a coating on the associated surfaces of the web 78 and outer portion 76, it may alternatively be referred to as a spring engagement coating. In embodiments wherein the spring engagement lining 3 is a separate element that is self-supporting and that is pressed into place into the outer portion 76, it may alternatively be referred to as a spring tray. In either case, the web 78 and the outer portion 76 may be considered structural portions of the pulley 2, while the lining 3 may be provided so as to provide a selected amount of friction during sliding movement with the springs 5.

With reference to FIG. 4, the pulley 2 has a first pulley drive surface 82 that is engageable with the first spring end 40 of the first spring 5a, and a second pulley drive surface 84 that is angularly spaced from the first pulley drive surface 82 by a pulley drive surface spacing S2, and that is engageable with the second spring end 42 of the first spring 5a. The pulley 2 has another first pulley drive surface 86 that is engageable with the first spring end 40 of the second spring 5b, and a second pulley drive surface 88 that is angularly spaced from the first pulley drive surface 86 (also by the spacing S2), and that is engageable with the second spring end 42 of the second spring 5b.

A first end member 6a is provided at the first end 40 of each spring 5. The first end member 6a is engaged with the first spring end 40. A second end member 6b is provided at the second end 42 of each spring 5. The second end member 6b is engaged with the second spring end 42. Each spring 5 has an opening 90 at each of the first and second ends 40 and 42. The first and second end members 6a and 6b each have a coil retaining projection 7 thereon which is snugly captured in the opening 90 so as to hold the first and second spring ends 40 and 42.

Figure 7A:
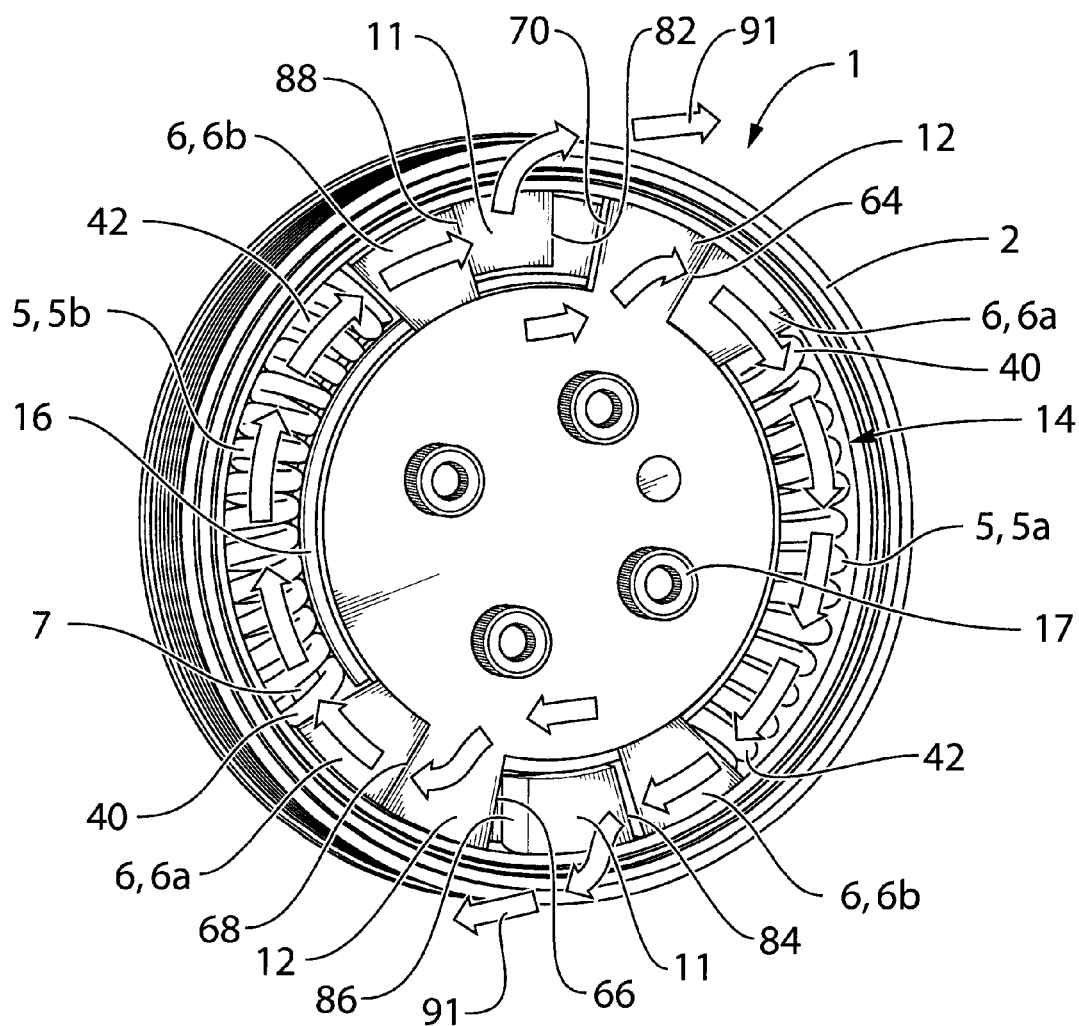
FIG. 7a is a perspective left-side view of isolator with double acting spring system with the pivotable driver in the position when the engine is started.
Figure 7D:
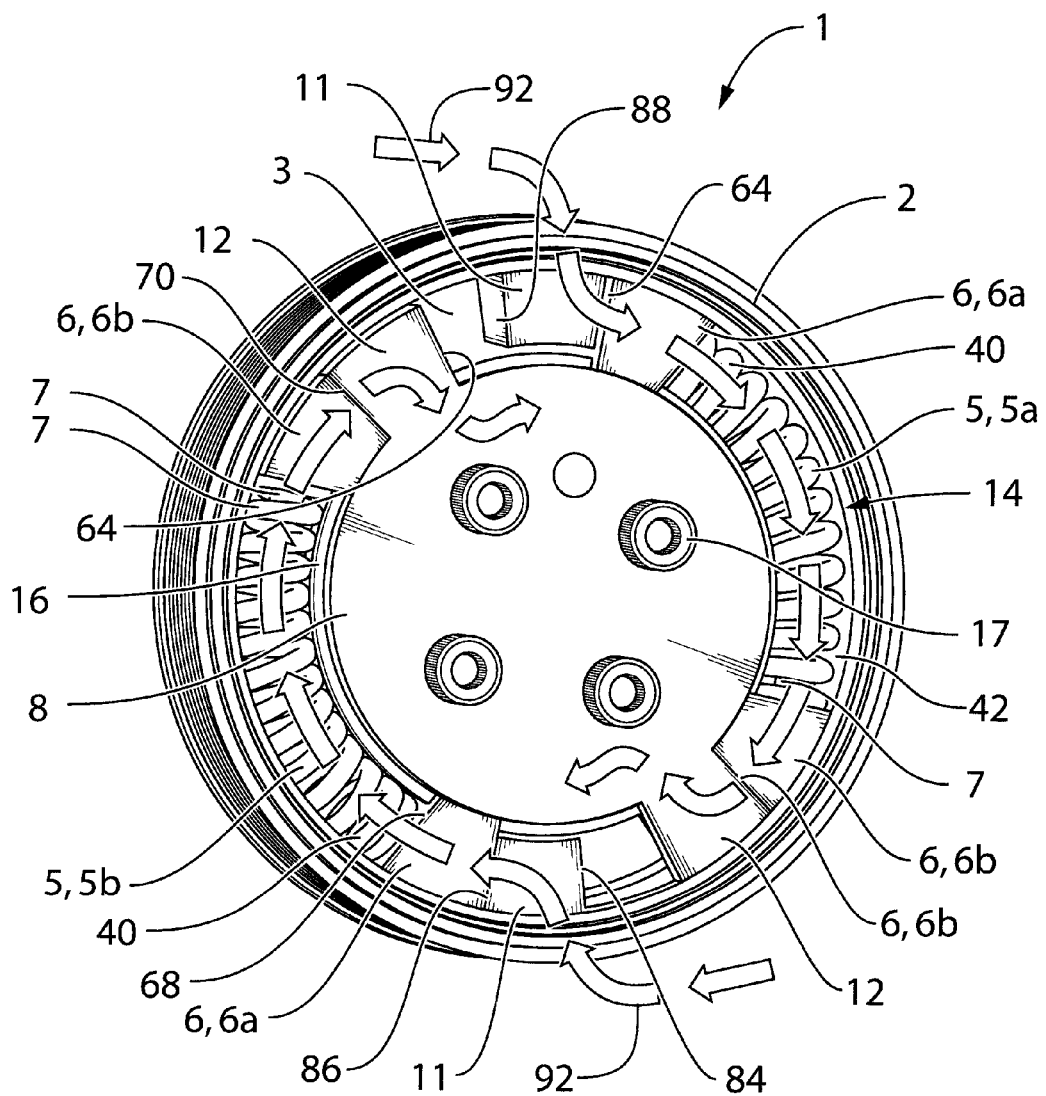
FIG. 7d is a perspective left-side view of isolator with double acting spring system with the pivotable driver in the position when the engine crankshaft is driven by the belt.
Figure 8:
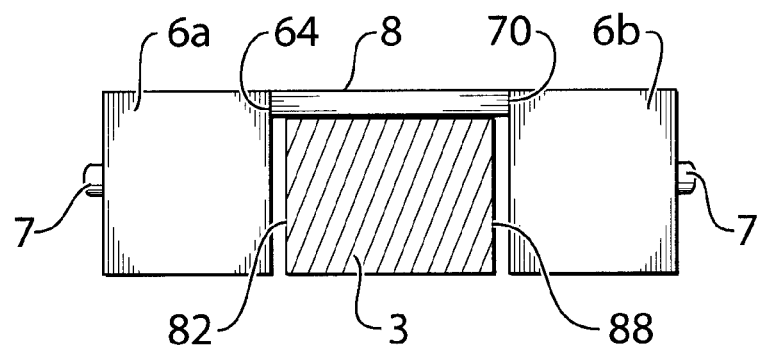
FIG. 8 is an edge view of a portion of the isolator to show elements that engage the springs of the spring system.
Figure 9:
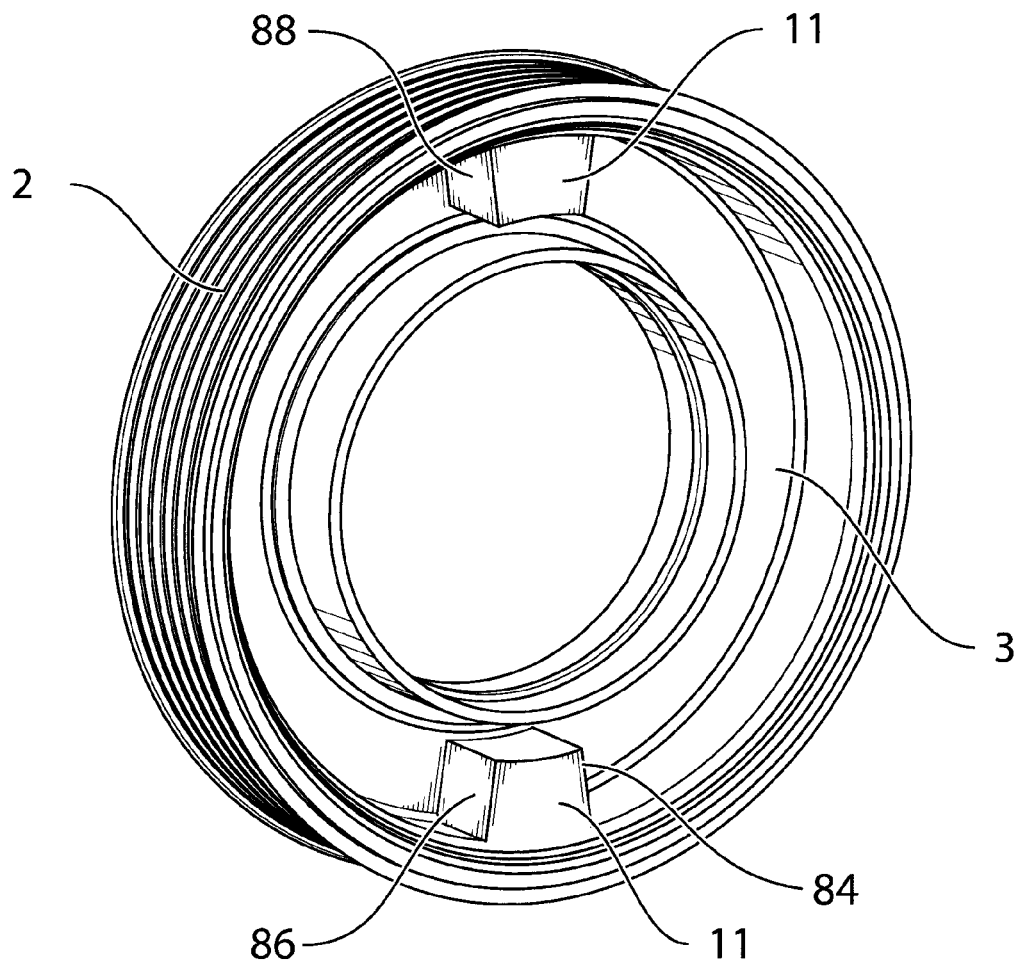
FIG. 9 is a perspective left-side view of the pulley with spring tray of isolator with double acting spring system.
Figure 10:
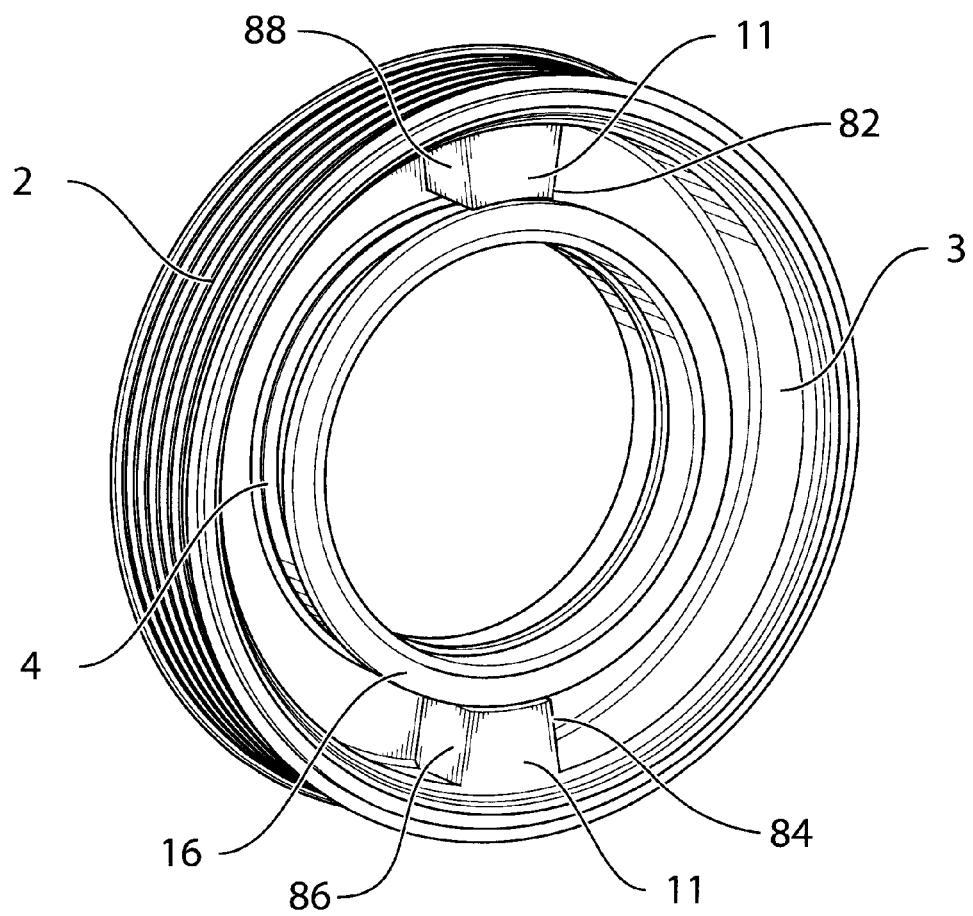
FIG. 10 is a perspective left-side view of the pulley with spring tray and the support ring of isolator with double acting spring system.

The first pulley drive surface 82 and first adapter drive surface 64 are proximate each other axially, as can be seen in FIG. 8, and are both engageable with the first spring end 40 on the first spring 5a through the first end member 6a. Similarly, the first pulley drive surface 86 and first adapter drive surface 68 are proximate each other axially and are both engageable with the first spring end 40 on the second spring 5b through the other first end member 6a (as shown in FIGS. 7a and 7d respectively). With continued reference to FIGS. 7a and 7d, the second pulley drive surface 84 and second adapter drive surface 66 are both engageable with the second spring end 42 of the first spring 5a through the second end member 42. As shown in FIG. 8, the second pulley drive surface 88 and second adapter drive surface 70 are both engageable with the second spring end 42 of the second spring 5b through the other second end member 42.

The end members 6a and 6b are constrained to move along a circumferential path about the axis A. For example, in the embodiment shown in FIGS. 1a-11 the end members 6a and 6b are constrained axially by a flange 16 on a support ring 4, which may also be referred to as a bushing 4. The flange 16 is received in a groove 15 in each of the end members 6a and 6b, and the end members 6a and 6b are constrained radially by the outer portion 76 of the pulley 2

(specifically the portion of the lining 3 that is on the outer portion 76) and by the outer surface of the bushing 4.

FIG. 7a shows torque transfer (see arrows 91) from the shaft adapter 54 to the pulley 2, as would occur during normal operation of the engine 51. This torque transfer drives the belt 52 (FIG. 1) which in turn drives one or more accessories such as the MGU 53. As can be seen, torque is transferable from the shaft adapter 54 to the springs 5 through the first spring ends 40, and from the springs 5 to the pulley 2 through the second spring ends 42. FIG. 7d shows torque transfer from (see arrows 92) the pulley 2 to the shaft adapter 54, as would occur during a BAS start event (i.e. when the MGU 53 (FIG. 1) is used to drive the belt 52, in order to start the engine by transferring torque from the belt 52 to the crankshaft). As can be seen, torque is transferable from the pulley 2 to the springs 5 through the first spring ends 40, and from the springs 5 to the shaft adapter 54 through the second spring ends 42.

As can be seen in FIG. 4, one of the adapter and pulley drive surface spacings S1 and S2 is larger than the other of the adapter and pulley drive surface spacings S1 and S2. In the example embodiment shown in FIG. 1a-11, the spacing S2 is larger than the spacing S1. However, it is alternatively possible for the spacing S1 between the adapter drive surfaces 64 and 66 (and between surfaces 68 and 70) to be larger than the spacing S2 between the pulley drive surfaces 82 and 84 (and between surfaces 86 and 88).

As a result of having one spacing S1 or S2 be larger than the other, when transitioning from torque transfer from the shaft adapter 54 to the pulley 2 to torque transfer from the pulley 2 to the shaft adapter 54, the second adapter drive surfaces 66 and 70 engage the second spring ends 42 (via the end members 6b) at a different time than the first adapter drive surfaces 64 and 68 disengage from the first spring ends 40, and the second pulley drive surfaces 84 and 88 disengage from the second spring ends 42 at a different time than the first pulley drive surfaces 82 and 86 engage the first spring ends 40 (via the end members 6a). Analogously, when transitioning from torque transfer from the pulley 2 to the shaft adapter 54 to torque transfer from the shaft adapter 54 to the pulley 2 the first adapter drive surfaces 64 and 68 engage the first spring ends 40 at a different time than the second adapter drive surfaces 66 and 70 disengage from the second spring ends 42, and the first pulley drive surfaces 82 and 86 disengage from the first spring ends 40 at a different time than the second pulley drive surfaces 84 and 88 engage the second spring ends 42.

Figure 7B:
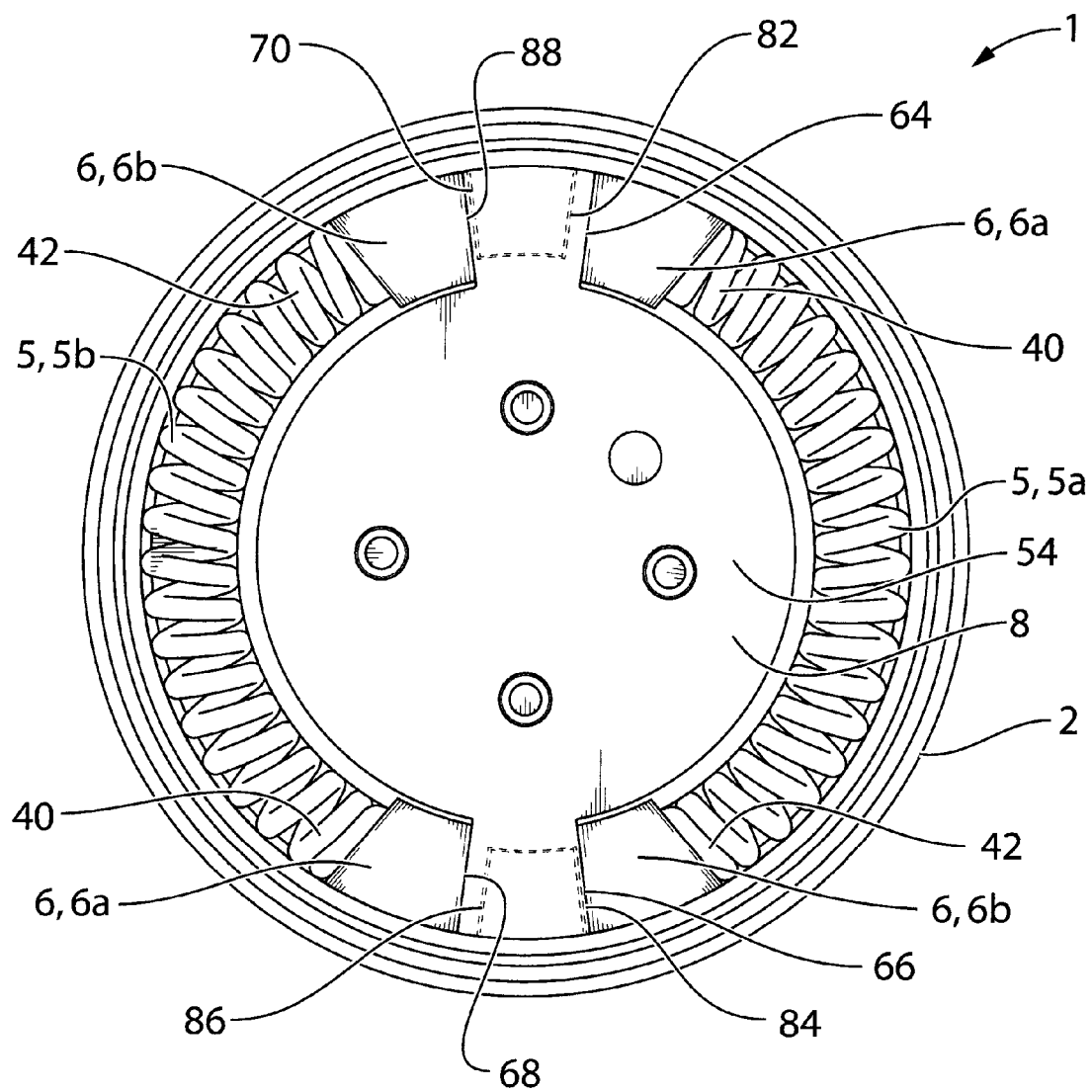
FIGS. 7b and 7c are elevation side views of the isolator shown in FIG. 1 during transition in torque transfer.
Figure 7C:
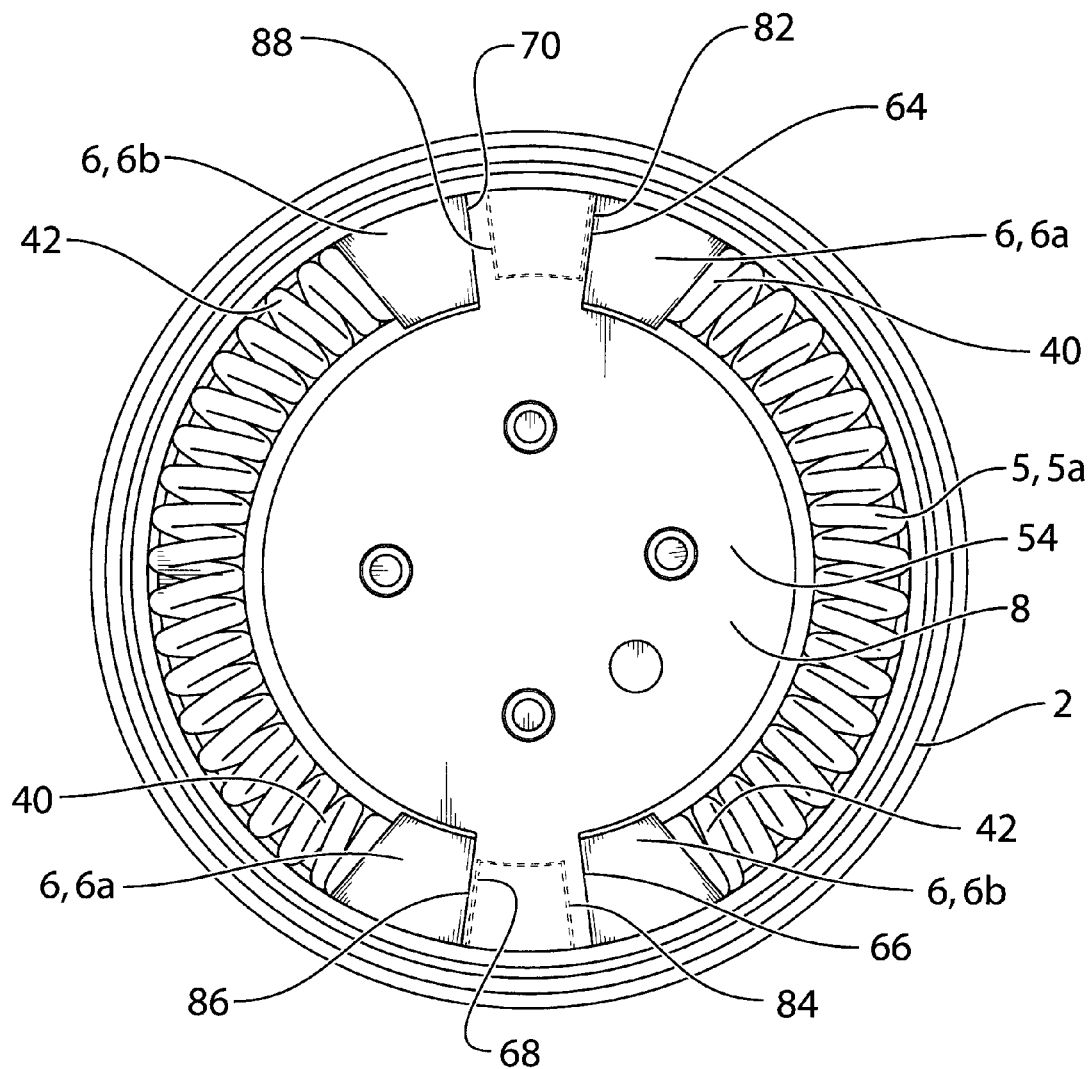

The transition from torque transfer from the shaft adapter 54 to the pulley 2 to torque transfer from the pulley 2 to the shaft adapter 54 is illustrated in the progression of figures from FIG. 7a to FIG. 7d. As shown in FIG. 7a, when torque is being transferred from the shaft adapter 54 to the pulley 2, the first adapter drive surfaces 64 and 68 are engaged with the first spring ends 40 through the first end members 6a, and the second spring ends 42 are engaged with the second pulley drive surfaces 84 and 88 via the second end members 6b. In the example shown, the shaft adapter 54 and the pulley 2 rotate clockwise, however, in other examples, it will be understood that they could rotate counterclockwise. As the torque transferred from the shaft adapter 54 to the pulley 2 decreases, the restoring force in the springs 5 drives the pulley 2 clockwise relative to the shaft adapter 54. FIG. 7b illustrates the moment when the springs 5 have driven the pulley 2 sufficiently clockwise that the second adapter drive surfaces 66 and 70 have engaged the second spring ends 5b via the second end members 6b, and the second pulley drive surfaces 84 and 88 are just about to disengage from the second end members 6b and therefore from the second spring ends 5b. FIG. 7b illustrates the moment that the torque transfer from the shaft adapter 54 to the pulley 2 drops to zero. If the torque on the pulley 2 is greater than the torque on the shaft adapter 54, the pulley 2 will proceed to overrun the shaft adapter 54. Shortly thereafter, the first pulley drive surfaces 82 and 86 will engage the first spring ends 40 via the first end members 6a. FIG. 7c shows the moment when the first pulley drive surfaces 82 and 86 engage the first end members 6a (and therefore the first spring ends 40) and when the relative movement of the pulley 2 with respect to the shaft adapter 54 is about to cause disengagement of the first adapter drive surfaces 64 and 68 from the first end members 6a (and therefore from the first spring ends 40). FIG. 7d illustrates the state, as noted above, where torque is transferred from the pulley 2 to the shaft adapter 54.

The transition from torque transfer from the pulley 2 to the shaft adapter 54 to torque transfer from the shaft adapter 54 to the pulley 2 is illustrated in the progression of figures from FIG. 7d to FIG. 7a. FIG. 7c shows the moment when the first adapter drive surfaces 64 and 68 engage the first end members 6a (and therefore the first spring ends 40) and when the relative movement of the shaft adapter 54 with respect to the pulley 2 is about to cause disengagement of the first pulley drive surfaces 64 and 68 from the first end members 6a (and therefore from the first spring ends 40). Shortly thereafter, continued relative movement of the shaft adapter 54 compared to the pulley 2, will cause the second pulley drive surfaces 84 and 88 to engage the second spring ends 42 via the first end members 6b. FIG. 7b shows the moment that the second pulley drive surfaces 84 and 88 to engage the second spring ends 42 via the first end members 6b and are about to cause disengagement of the second adapter drive surfaces 66 and 70 from the second end members 6b and therefore from the second spring ends 42. FIG. 7a illustrates the state, as noted above, where torque is transferred from the shaft adapter 54 to the pulley 2.

It can be seen from FIGS. 7b and 7c that there is a small amount of lost motion provided between the pulley drive surfaces and the adapter drive surfaces. This lost motion is provided because of the spacing difference between the spacings S1 and S2. This lost motion is generally small and would, under many circumstances, not be sufficient to prevent torque transfer from taking place between the shaft adapter 54 and pulley 2 during startup of a typical engine. By contrast, the spacing difference between spacings S1 and S2 is not selected to prevent torque transfer during engine startup; it is instead selected to keep the kinetic energies of impacts during engagement of the various drive surfaces with the spring ends below a selected level so that the noise associated with these impacts is less than a selected threshold level. The selected threshold level may differ for different applications. For example, when configuring the isolator 1 on a luxury car, a relatively low threshold may be used, and when configuring the isolator 1 on a luxury car, a relatively higher threshold may be used. However, in each case, the size of the spacing difference used is based on keeping the kinetic energies of the aforementioned impacts is below a selected threshold. There are four impacts that take place, each having an associated kinetic energy. A first kinetic energy is associated with the impact during engagement between the second adapter drive surfaces 66 and 70 and the second spring ends 42 (via the end members 6b). A second kinetic energy is associated with the impact during engagement between the first pulley drive surfaces 82 and 86 and the first spring ends 40 (via the end members 6a). A third kinetic energy is associated with the impact during engagement between the first adapter drive surfaces 64 and 68 and the first spring ends 40 (via the end members 6*a*). A fourth kinetic energy is associated with the impact during engagement between the second pulley drive surfaces 84 and 88 and the second spring ends 42 (via the end members 6*b*).

In order to keep the kinetic energies of the impacts sufficiently low, the spacing difference is selected, based on one or more of several parameters (and preferably all of these parameters). The parameters include the moment of inertia of the pulley, the moment of inertia of the shaft adapter, the maximum amount of torque that the isolator 1 will be designed to transfer, the materials that make up the adapter drive surfaces 64, 66, 68 and 70 and the materials that make up the pulley drive surfaces 82, 84, 86 and 88. In particular, the spacing difference may be reduced as the moment of inertia of either the pulley 2 or the shaft adapter 54 increases. The spacing difference may be reduced as the maximum torque to be transferred increases. The spacing difference may be reduced as the hardness of the materials of the pulley and adapter drive surfaces increases. By reducing the spacing difference, the amount of energy buildup that takes place between the first impact and the second impact that occur during a transition in torque transfer from the shaft adapter 54 to the pulley 2 to torque transfer from the pulley 2 to the shaft adapter 54, or during a transition in torque transfer from the pulley 2 to the shaft adapter 54 to torque transfer from the shaft adapter 54 to the pulley 2.

In general, throughout this disclosure, the term 'impact' refers to when engagement occurs between one of the pulley or adapter drive surfaces and an associated surface of the end members 6.

Put another way, when the isolator 1 is at rest, the adapter and pulley drive surfaces are configured have positions relative to one another that are selected based on a moment of inertia of the pulley 2 and a moment of inertia of the shaft adapter 54, based on a maximum torque to be transferred therebetween, and based on a material of the adapter drive surfaces 64, 66, 68 and 70 and a material of the pulley drive surfaces 82, 84, 86, and 88, such that when transitioning from torque transfer from the shaft adapter 54 to the pulley 2 to torque transfer from the pulley 2 to the shaft adapter 54, the second adapter drive surfaces 66 and 70 engage the second spring ends 42 with a first kinetic energy and at a different time than the first adapter drive surfaces 64 and 68 disengage from the first spring ends 40, and the second pulley drive surfaces 66 and 70 disengage from the second spring ends 42 with a second kinetic energy and at a different time than the first pulley drive surfaces 82 and 86 engage the first spring ends 40, and such that when transitioning from torque transfer from the pulley 2 to the shaft adapter 54 to torque transfer from the shaft adapter 54 to the pulley 2 the first adapter drive surfaces 64 and 68 engage the first spring ends 40 with a third kinetic energy and at a different time than the second adapter drive surfaces 66 and 70 disengage from the second spring ends 42, and the first pulley drive surfaces 82 and 86 disengage from the first spring ends 40 with a fourth kinetic energy and at a different time than the second pulley drive surfaces 84 and 88 engage the second spring ends 42.

In many instances, it has been found that the spacing difference that was found to be acceptable is less than about 5 degrees. In many instances, it has been found that the spacing difference that was found to be acceptable is more than about 0.5 degrees.

It will be noted that the arrangement shown in FIGS. 1*a*-11 is particularly suited for use on a European engine. In Europe, it is typical to provide a relatively larger crankshaft end 13 and to use four fasteners 17 to mount the shaft adapter 54 to it. A variant of the isolator 1 is shown in FIGS. 12-23 that is particularly suited for use on a North American engine, which typically employs a relatively smaller crankshaft end 24 and a single centrally located fastener 23 and washer 19 (FIG. 23). A key 25 engages a slot in the crankshaft end 24 and corresponding slots in the hub 9, the driver 8, and a cap shown at 21. Some other differences between the isolator 1 shown in FIGS. 1*a*-11 and the isolator 1 shown in FIGS. 12-23 are described below.

Figure 13:
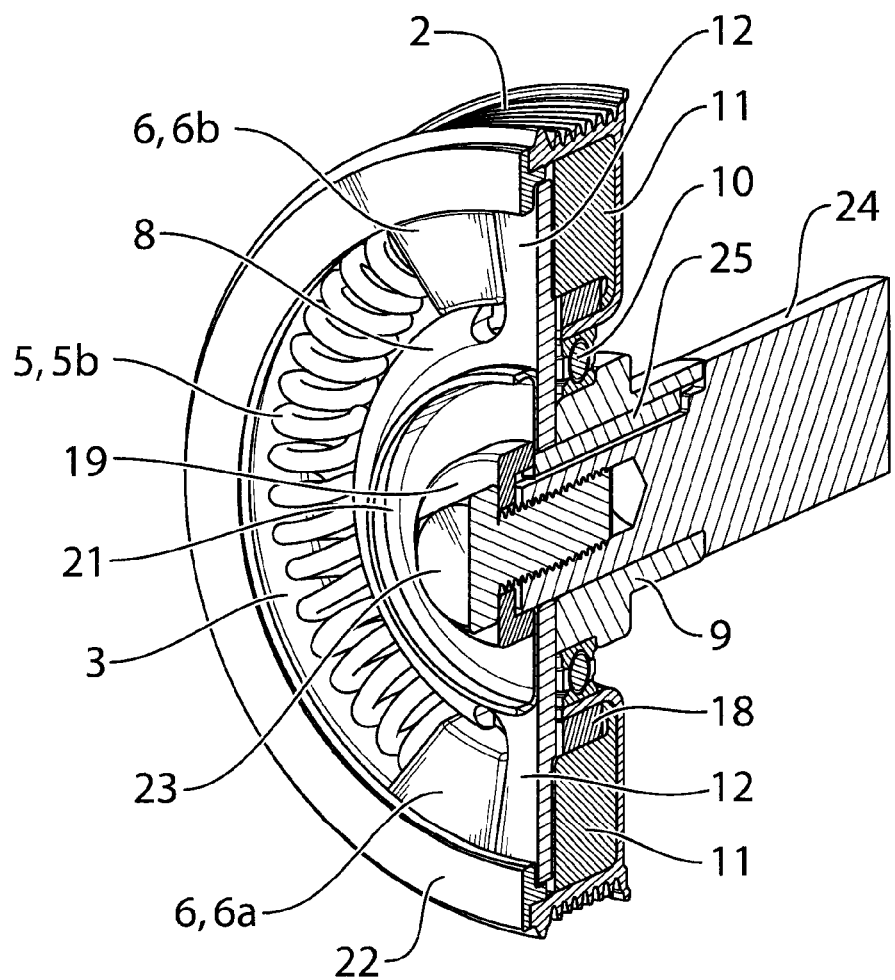
FIG. 13 is a perspective of longitudinal cross-section view of isolator with double acting spring system in the springs balancing position, as a variant of embodiment of the invention.
Figure 14:
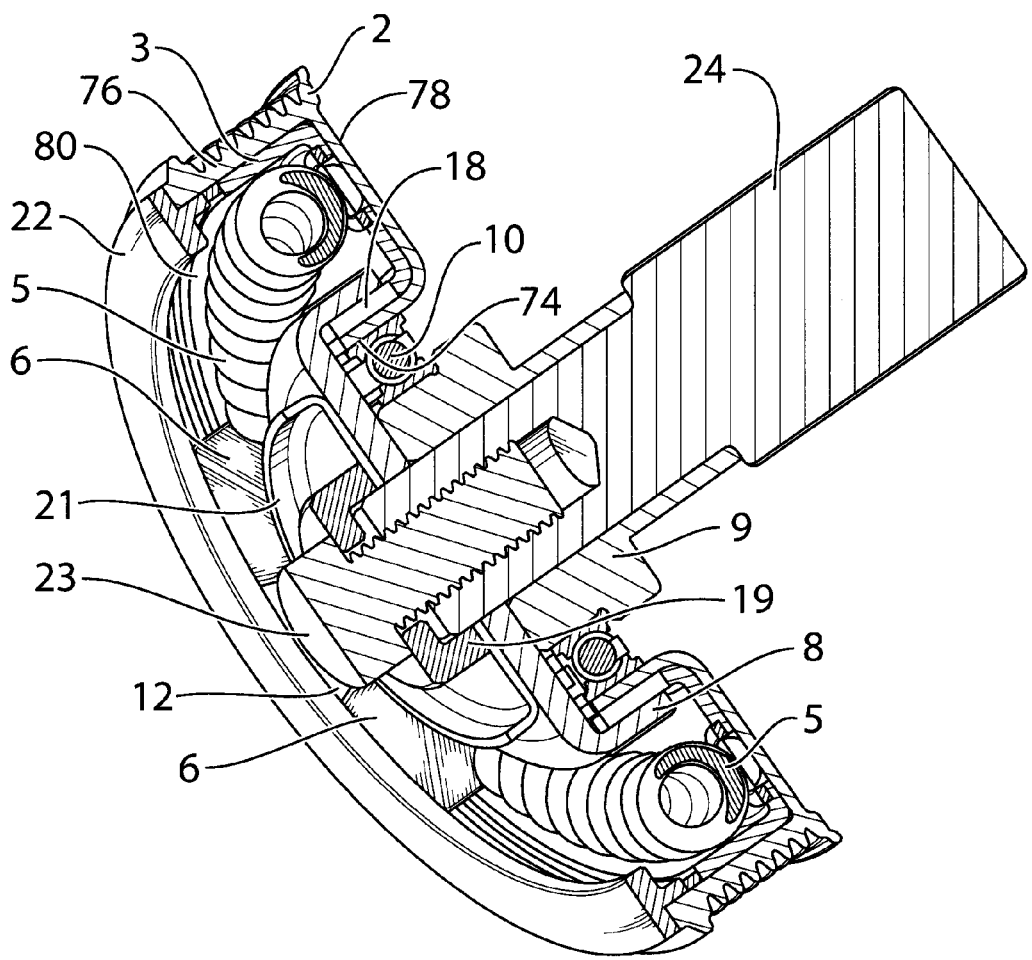
FIG. 14 is a perspective of longitudinal cross-section view of isolator with double acting spring system, as a variant of embodiment of the invention.
Figure 19:
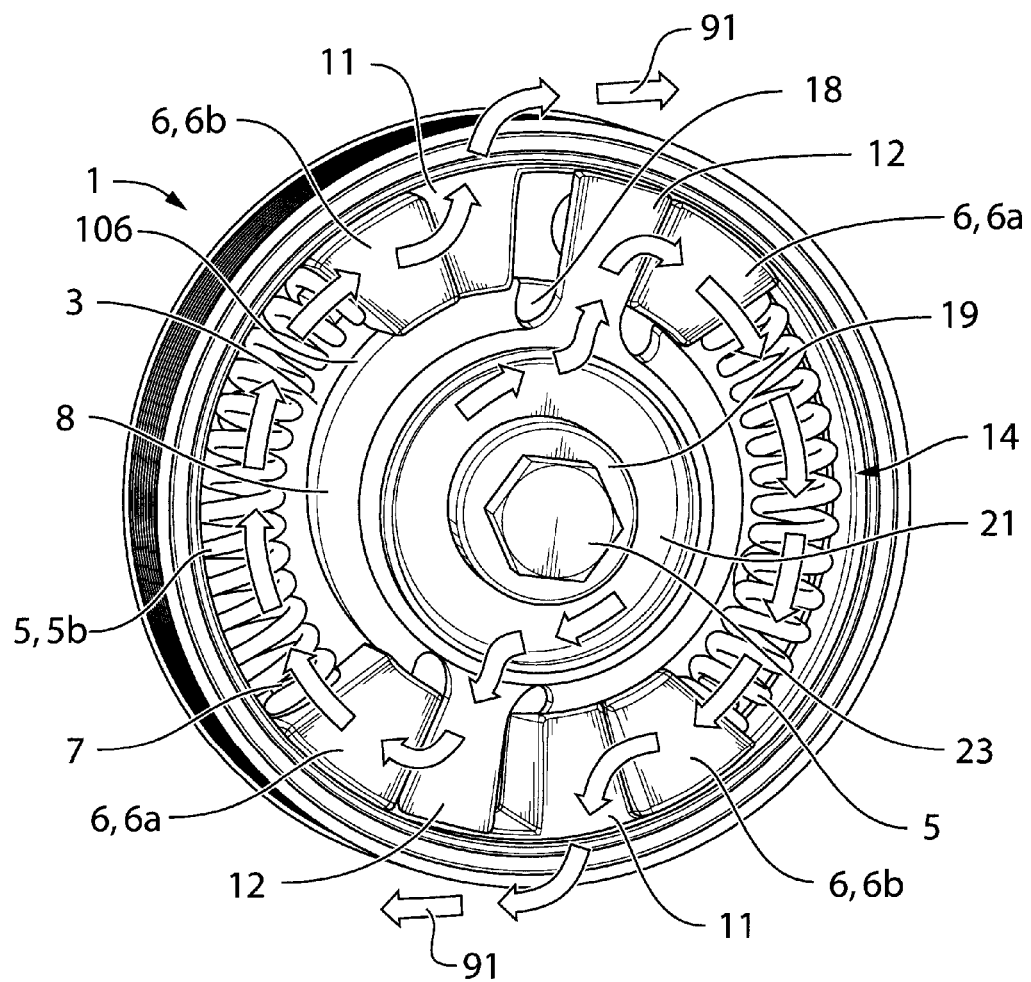
FIG. 19 is a perspective left-side view of isolator with double acting spring system excluding the cover ring in the position of the pivotable driver, when the engine is started, as a variant of embodiment of the invention.
Figure 20:
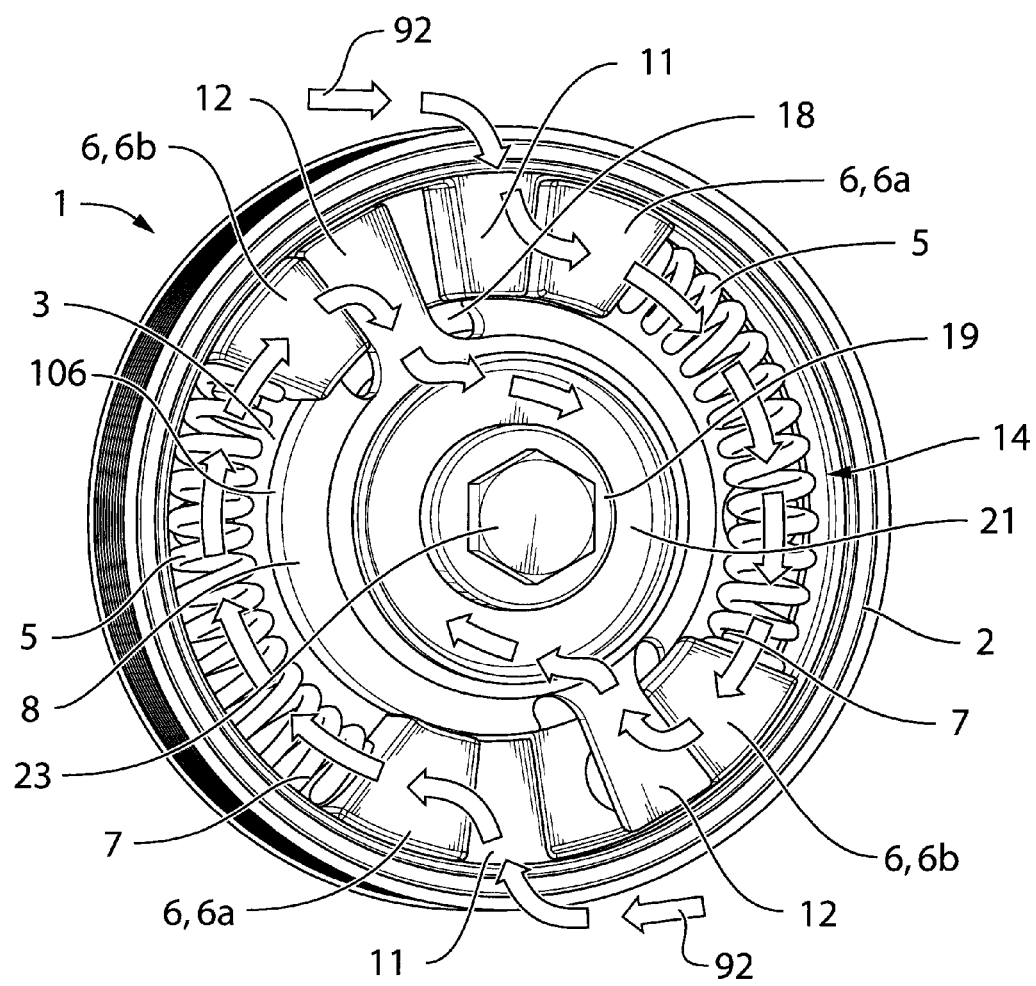
FIG. 20 is a perspective left-side view of isolator with double acting spring system excluding the cover ring in the position of the pivotable driver, when the engine crankshaft is driven by the belt, as a variant of embodiment of the invention.

As can be seen in FIG. 23 and the sectional views shown in FIGS. 13 and 14, the driver 8 has a different construction than the driver 8 shown in FIGS. 1*a*-11. The driver 8 in FIGS. 12-23 is made from a material having a uniform thickness. The driver 8 in FIGS. 12-23 further includes skirts 102 that extend axially out of the plane of the remainder of the driver 8. These skirts 102 impart some rigidity to the driver 8. As can be seen in FIGS. 20-23 there is a circumferential gap G between each pair of mutually facing ends of the skirts 102. Thus there are two gaps G in the embodiment shown in FIGS. 12-23. This circumferential gap G is filled with a projection 104 on a support ring 18 (which also may be referred to as a bushing 18). The bushing 18 shown in FIGS. 12-23 has two projections 104 to fill the two gaps G. The outer surface of the projections 104 and the outer surface of the skirts 102 combine to form a radial constraining and slide surface 106 for the end members 6*a* and 6*b*. As can be seen in FIGS. 19 and 20 in particular, the end members 6*a* and 6*b* slide along surface 106 during operation of the isolator 1.

It will be noted that the surface 106 does not include a flange that engages a groove in the end members 6. Instead, a cover member 22 is provided that forms part of the pulley 2 and partially encloses the spring chamber 80 that is defined in part by the web 78 and the outer portion 76. The end members 6 are constrained axially by the cover member 22 and by the web 78, and radially by the bushing (and optionally, as shown, by the outer surface of the skirts 102), and by the outer portion of the pulley, so as to permit travel along a circumferential path. The constraining of the end members 6 can be seen in FIG. 18.

Figure 15:
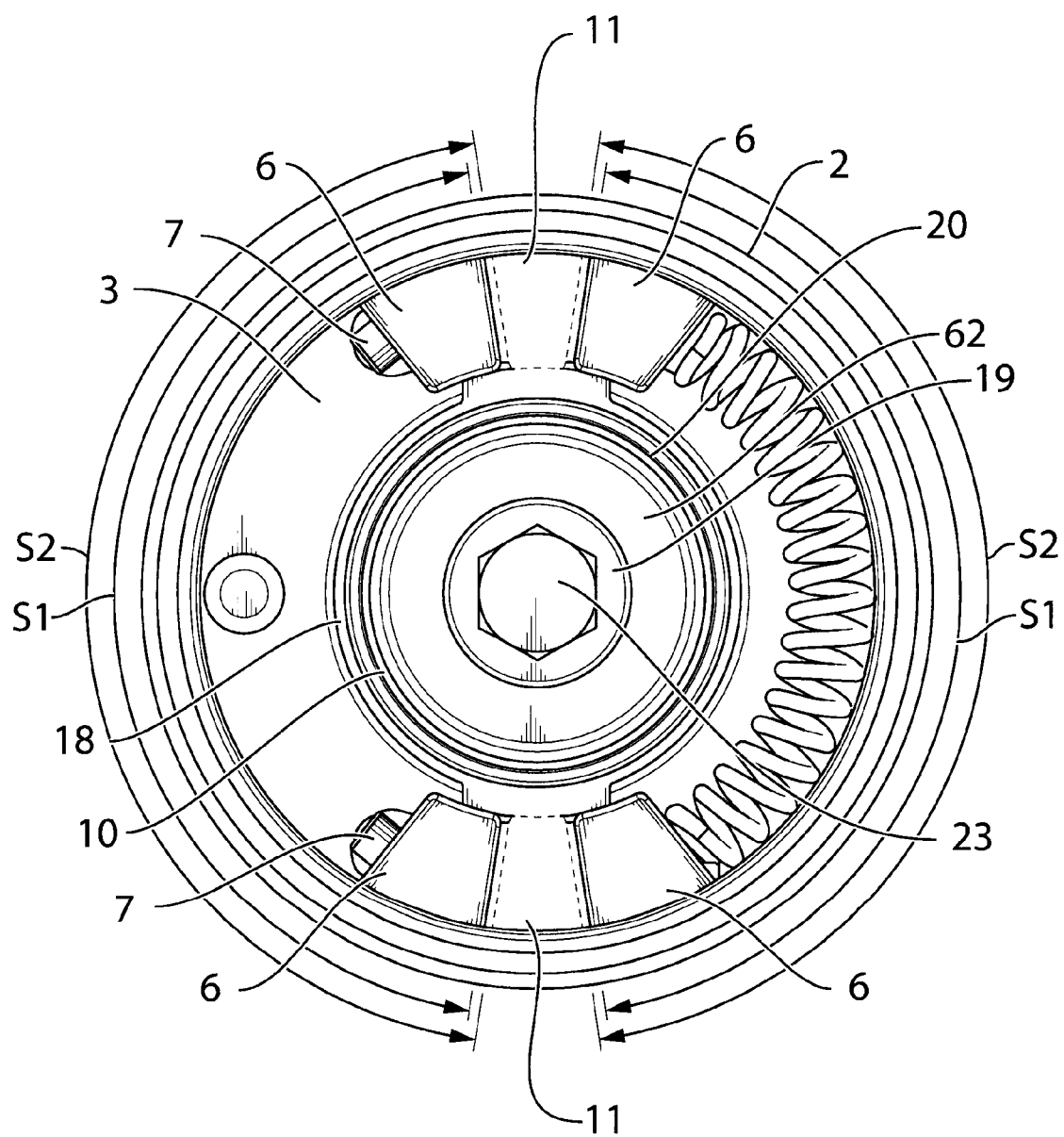
FIG. 15 is a front view of isolator with double acting spring system excluding the driver, cover ring, and left spring, as a variant of embodiment of the invention.

FIGS. 19 and 20 illustrate torque transfer from the shaft adapter 54 to the pulley 2 and from the pulley 2 to the shaft adapter 54 respectively. The transition between these two torque transfers is unchanged as compared to FIGS. 7*a*-7*d*. Additionally, the spacings S1 and S2 and the spacing differences are the same for the isolator 1 shown in FIGS. 12-23 as they are for the isolator 1 shown in FIGS. 1*a*-11. FIG. 15 shows the spacings S1 and S2.

Figure 16:
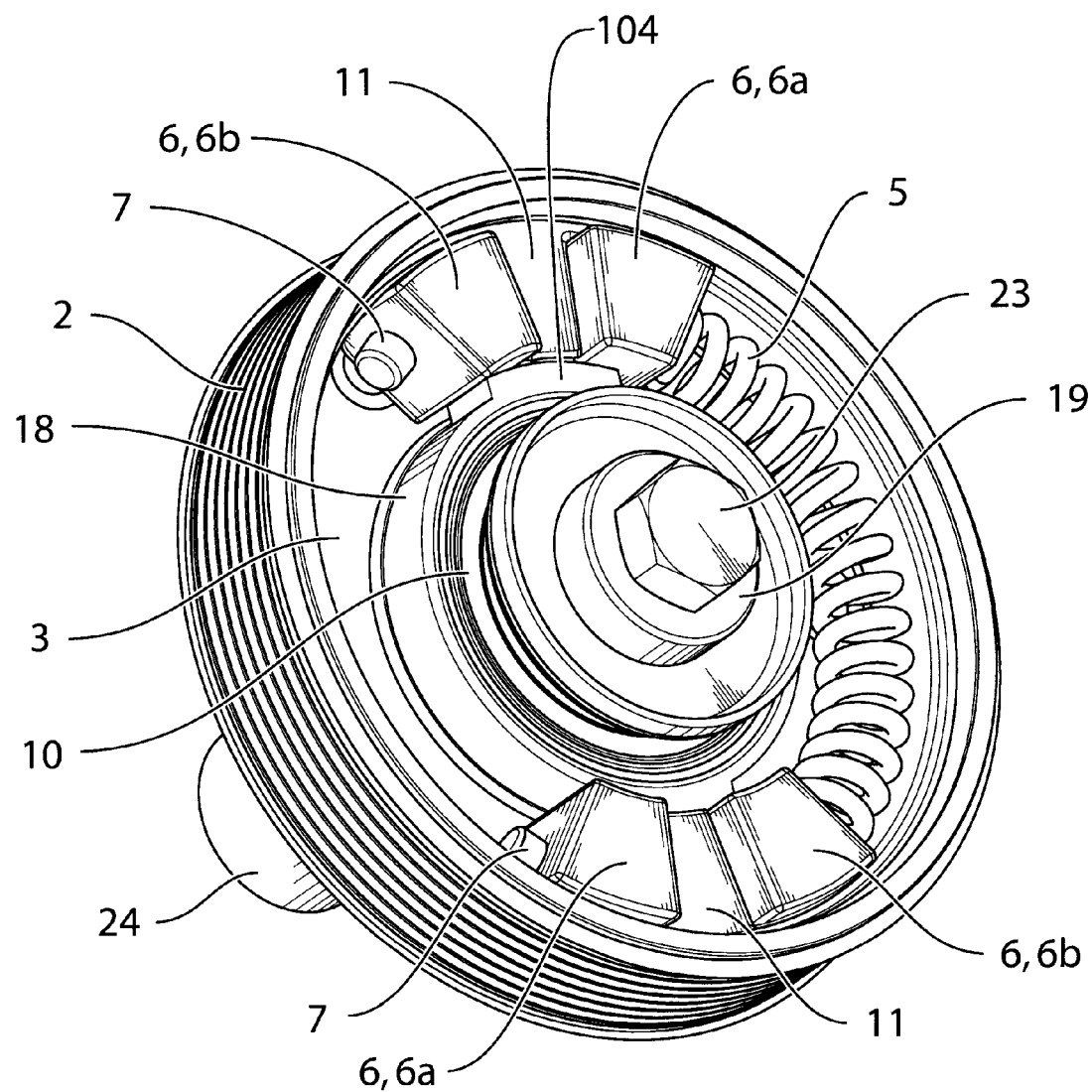
FIG. 16 is a perspective right-side view of isolator with double acting spring system excluding the driver, cover ring and left spring, as a variant of embodiment of the invention.
Figure 17:
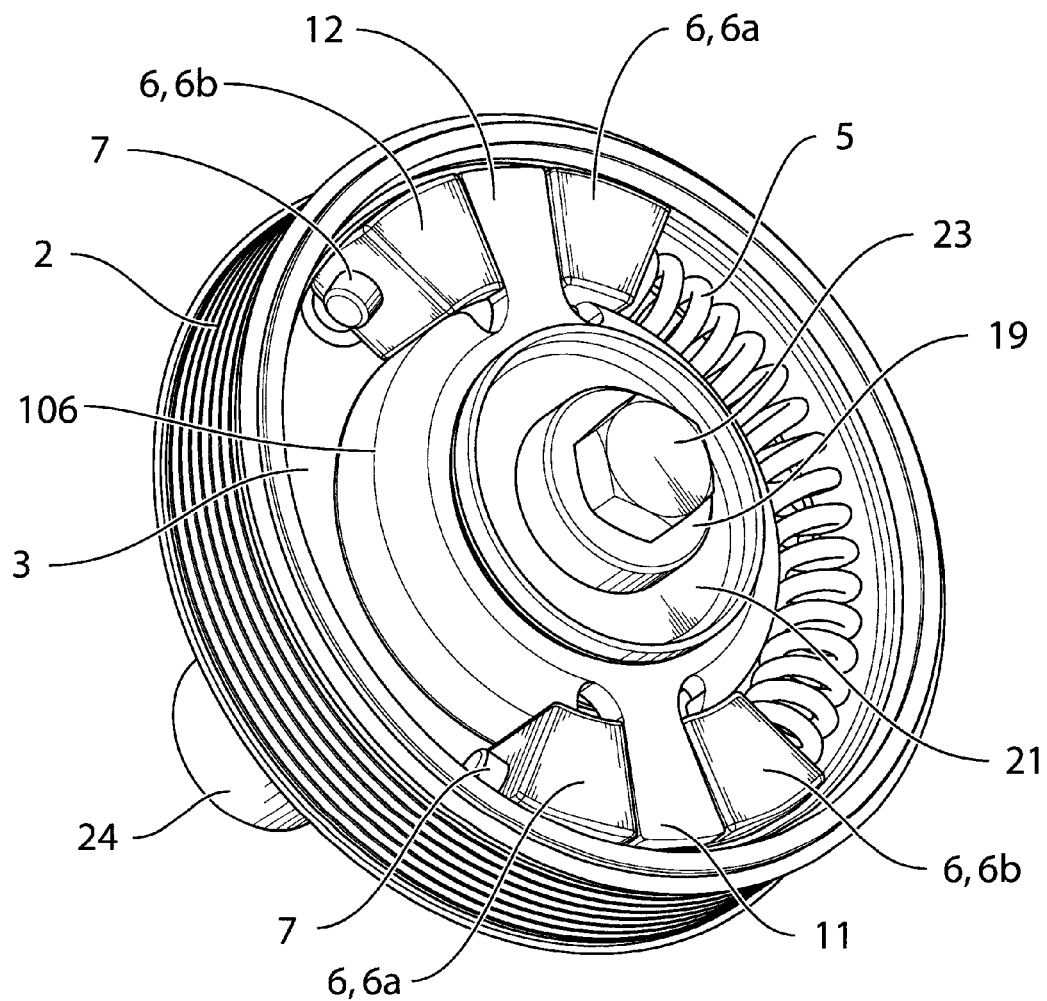
FIG. 17 is a detail perspective right-side view of isolator with double acting spring system excluding the left spring and cover ring, as a variant of embodiment of the invention.
Figure 18:
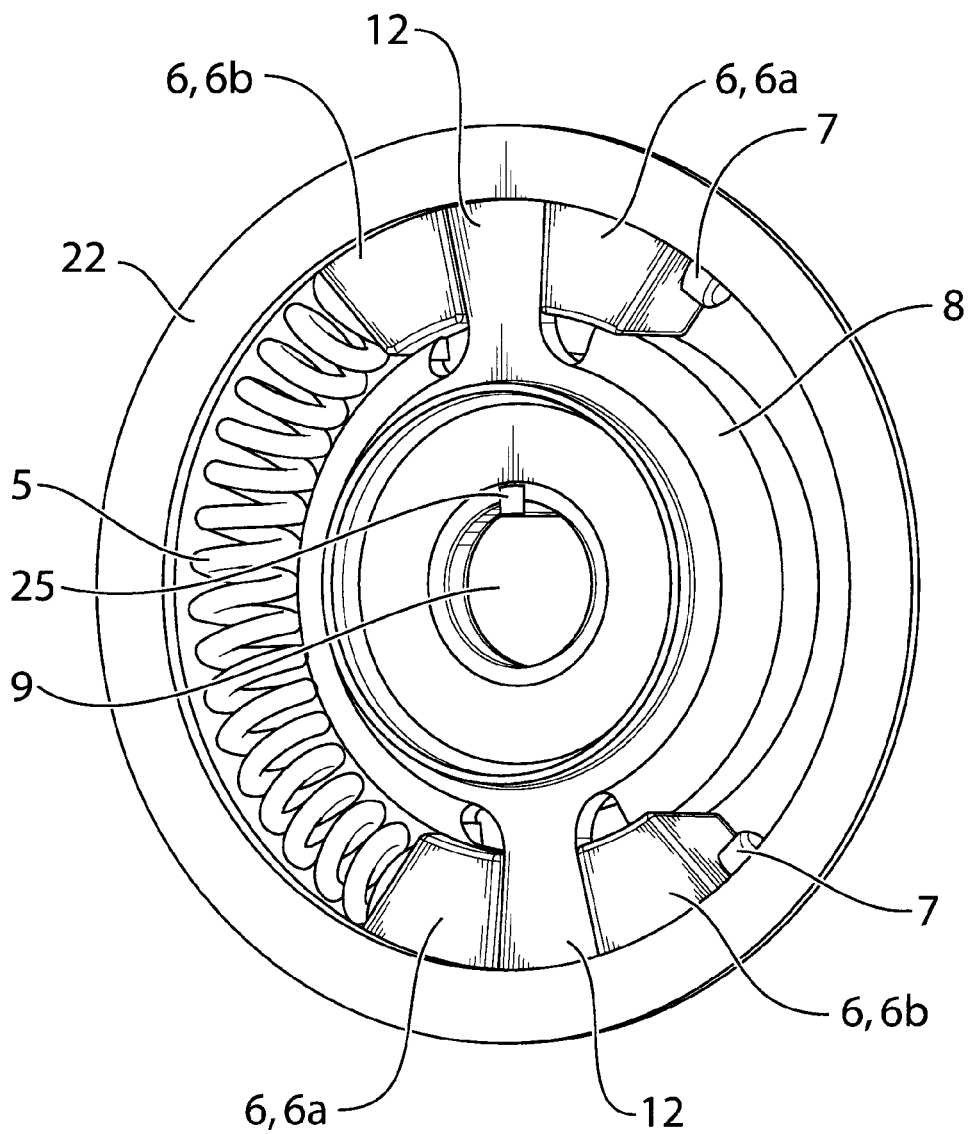
FIG. 18 is a detail perspective right-side view of isolator with double acting spring system, as a variant of embodiment of the invention.

FIGS. 16 and 17 show that the adapter drive surfaces 64, 66, 68 and 70 are axially adjacent the pulley drive surfaces that are on the projections 11.

Figure 21:
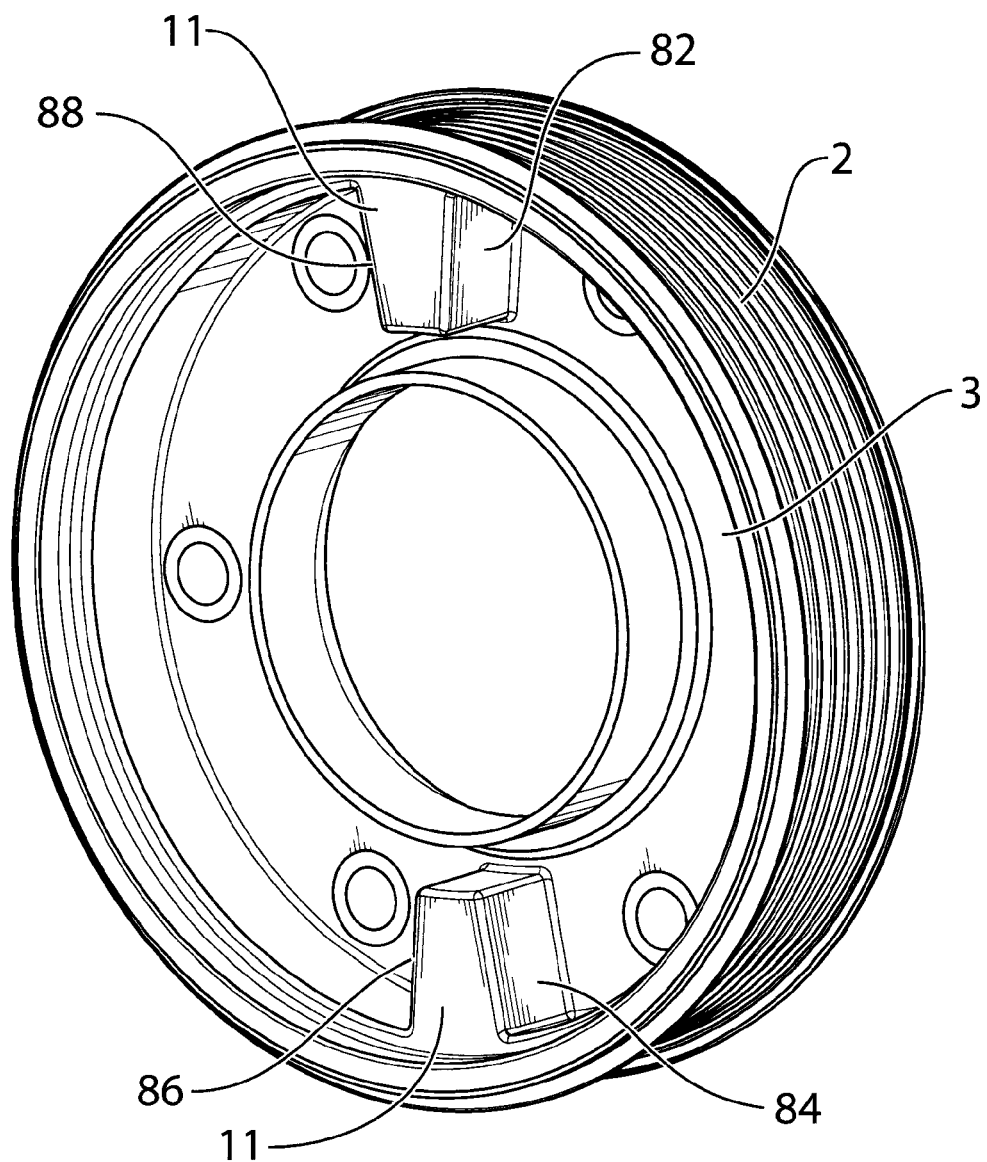
FIG. 21 is a perspective left-side view of the pulley and spring tray of isolator with double acting spring system, as a variant of embodiment of the invention.
Figure 22:
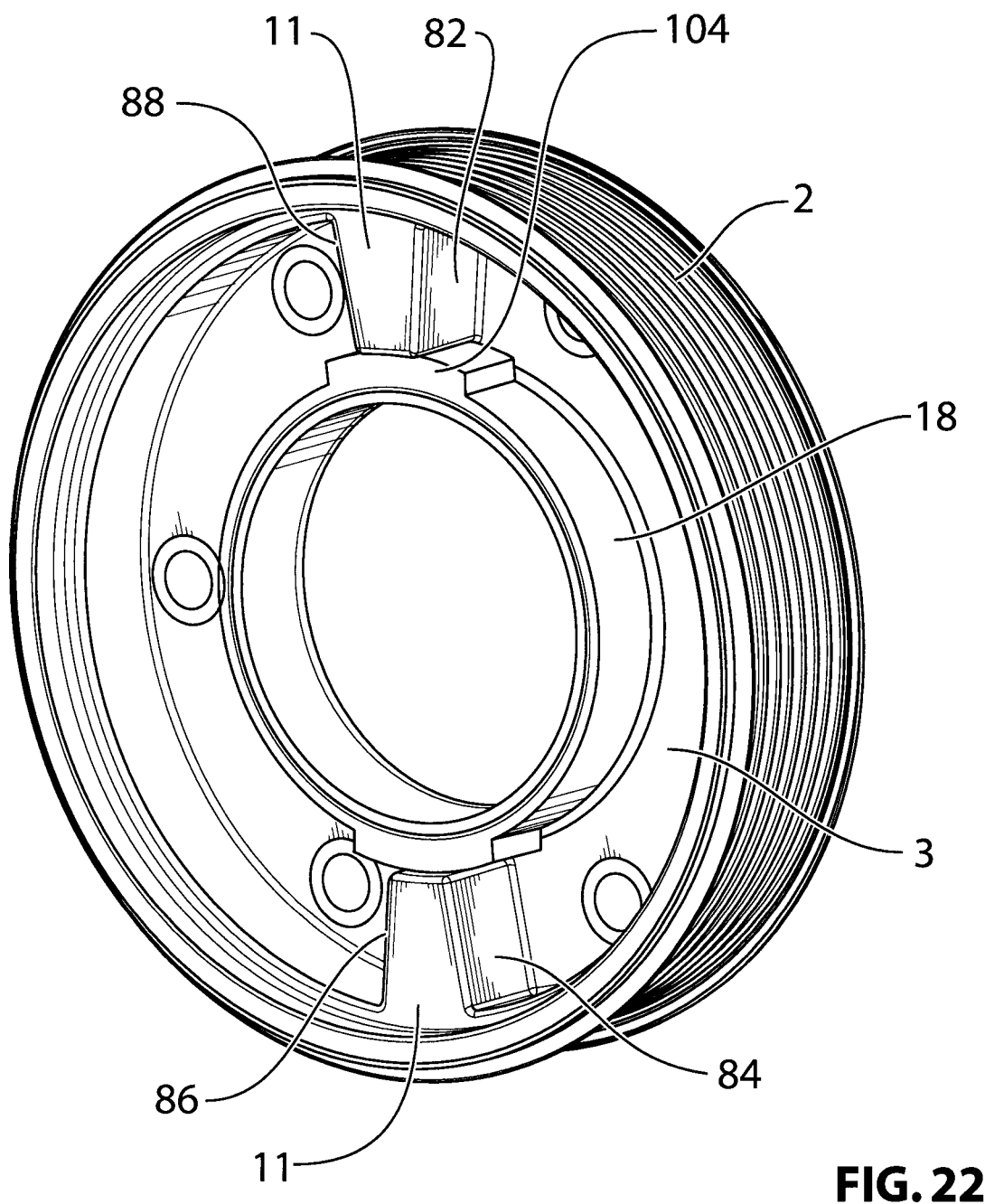
FIG. 22 is a perspective left-side view of the pulley with spring tray and the support ring of isolator with double acting spring system, as a variant of embodiment of the invention.
Figure 23:
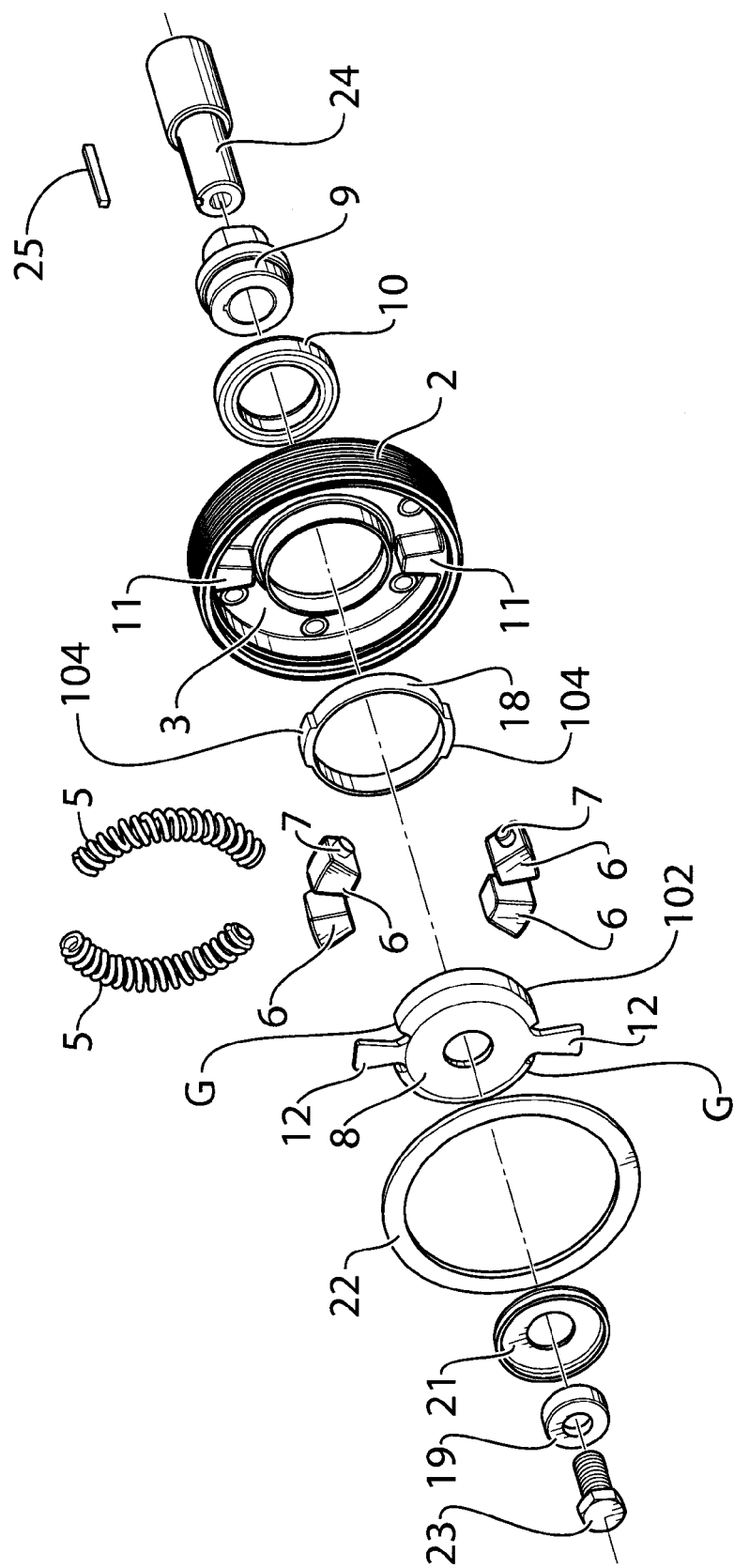
FIG. 23 is an exploded view of isolator with double acting spring system, as a variant of embodiment of the invention.

FIGS. 21 and 22 show the relationship between the projections 104 on the bushing 18 and the projections 11 that hold the pulley drive surfaces 82, 84, 86 and 88.

Due to the smaller size of the crankshaft end 24, a single larger bearing 10 may be used between the pulley 2 and the hub 9 in the embodiment shown in FIGS. 12-23 instead of the two smaller bearings 10 shown in FIG. 11.

Figure 24:
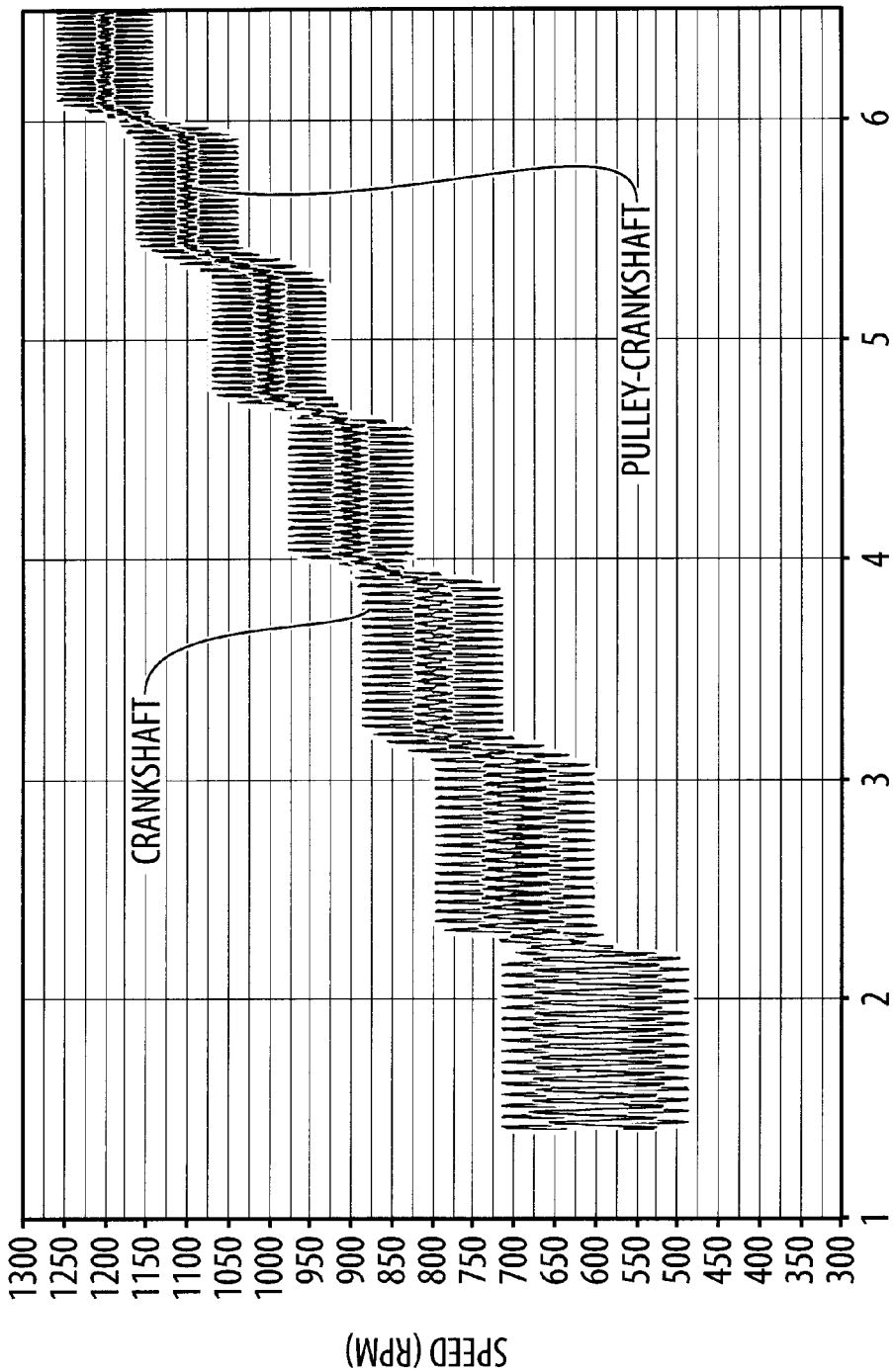
FIG. 24 is rotary speed profile of isolator with double acting spring system.

Referring to FIG. 24, a graph is provided which shows the amplitudes of oscillation of the shaft adapter 54 (curve 200) and the corresponding amplitudes of oscillation of the pulley 2 (curve 202), while running a test engine at different speeds. As can be seen, there is a significant reduction in the amplitudes of oscillation at the pulley 2 as compared to the shaft adapter 54. FIG. 24 is illustrative of the performance of the isolator 1 in both FIGS. 1a-11 and 12-23.

FIGS. 25-28 illustrate yet another variant of the isolator 1, but with a single spring 5 instead of two springs 5a and 5b as shown in FIGS. 1-23. In this embodiment, there is a only one first adapter drive surface (surface 64), one second adapter drive surface (surface 66) spaced from the surface 64 by spacing S1, one first pulley drive surface (surface 82) and one second pulley drive surface (surface 84), spaced from the surface 82 by spacing S2. The connection to the crankshaft is not shown (no fasteners are illustrated). Any suitable connection may be provided.

Figure 25:
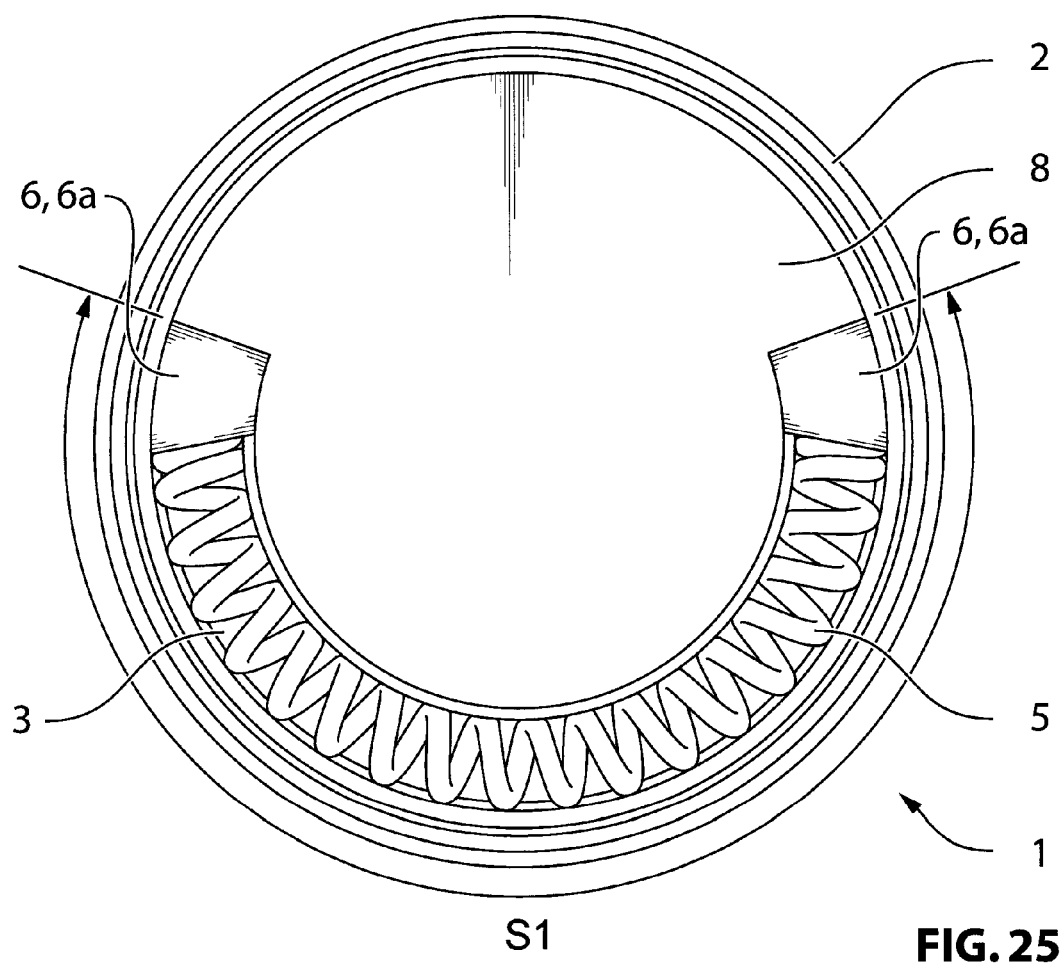
FIG. 25 is a front view of double acting spring system in the neutral balanced position, as a reference to the double acting functionality.
Figure 26:
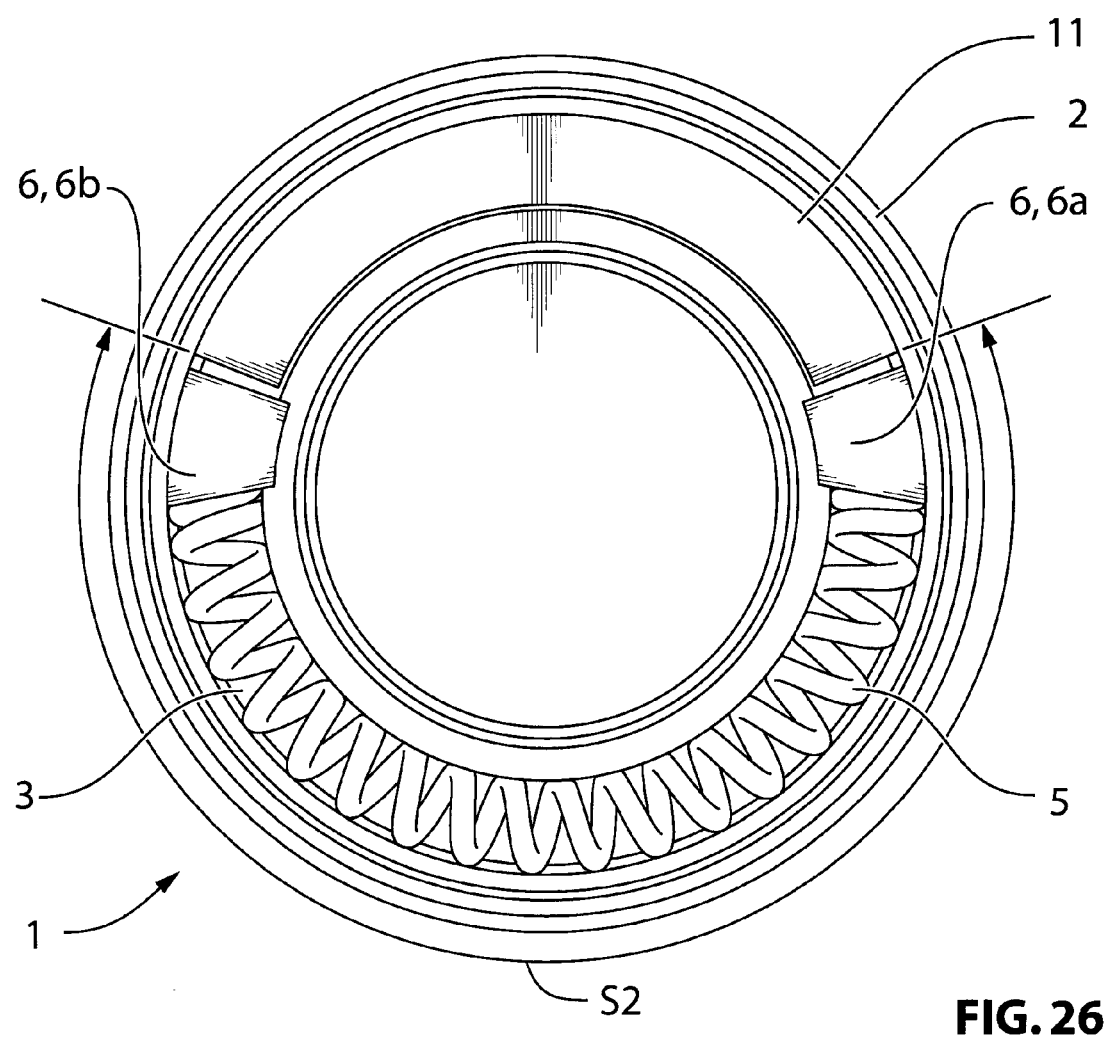
FIG. 26 is a front view of double acting spring system in the balanced position excluding the pivotable driver, as a reference to the double acting functionality.
Figure 27:
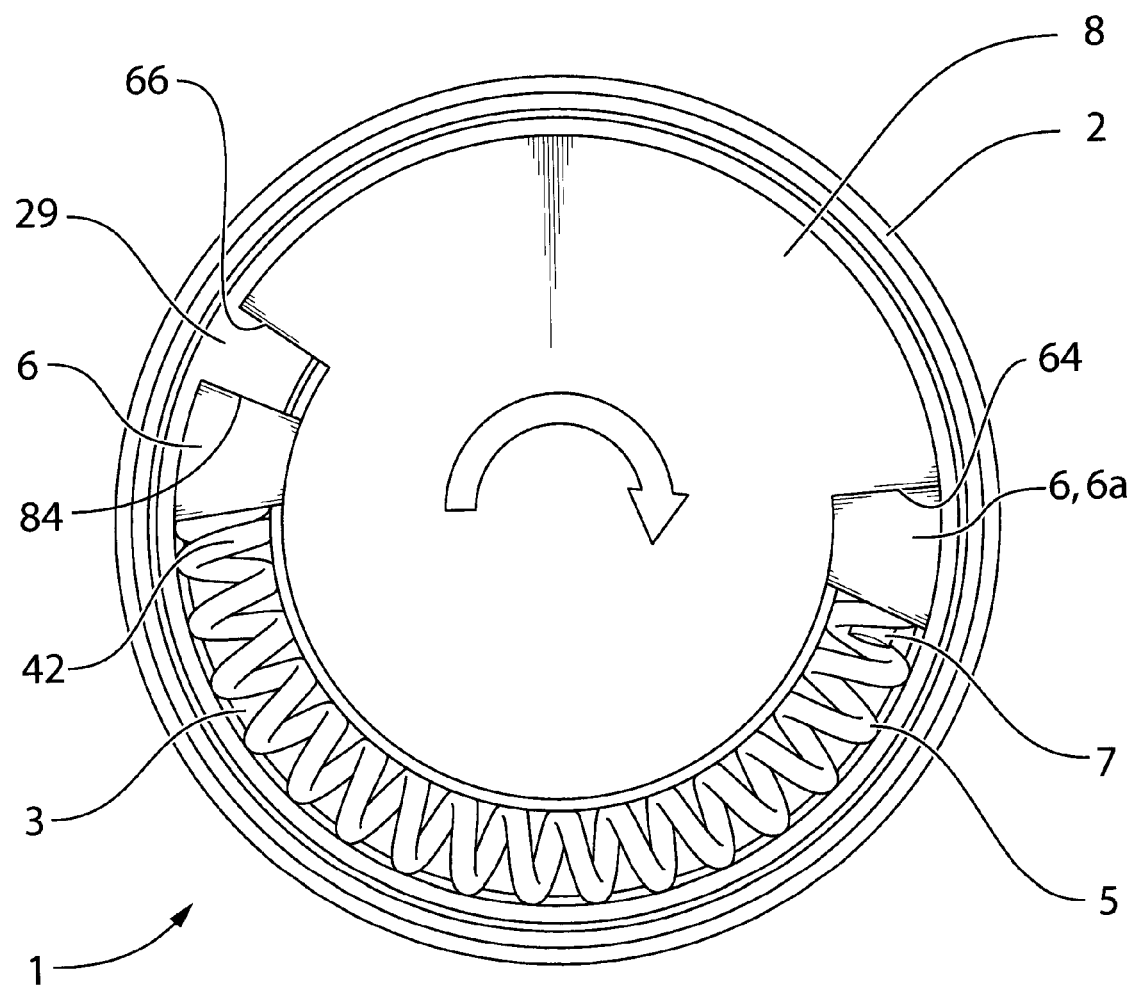
FIG. 27 is a front view of double acting spring system in the position when the pivotable driver is transferred a load an arrow direction, as a reference to the double acting functionality.
Figure 28:
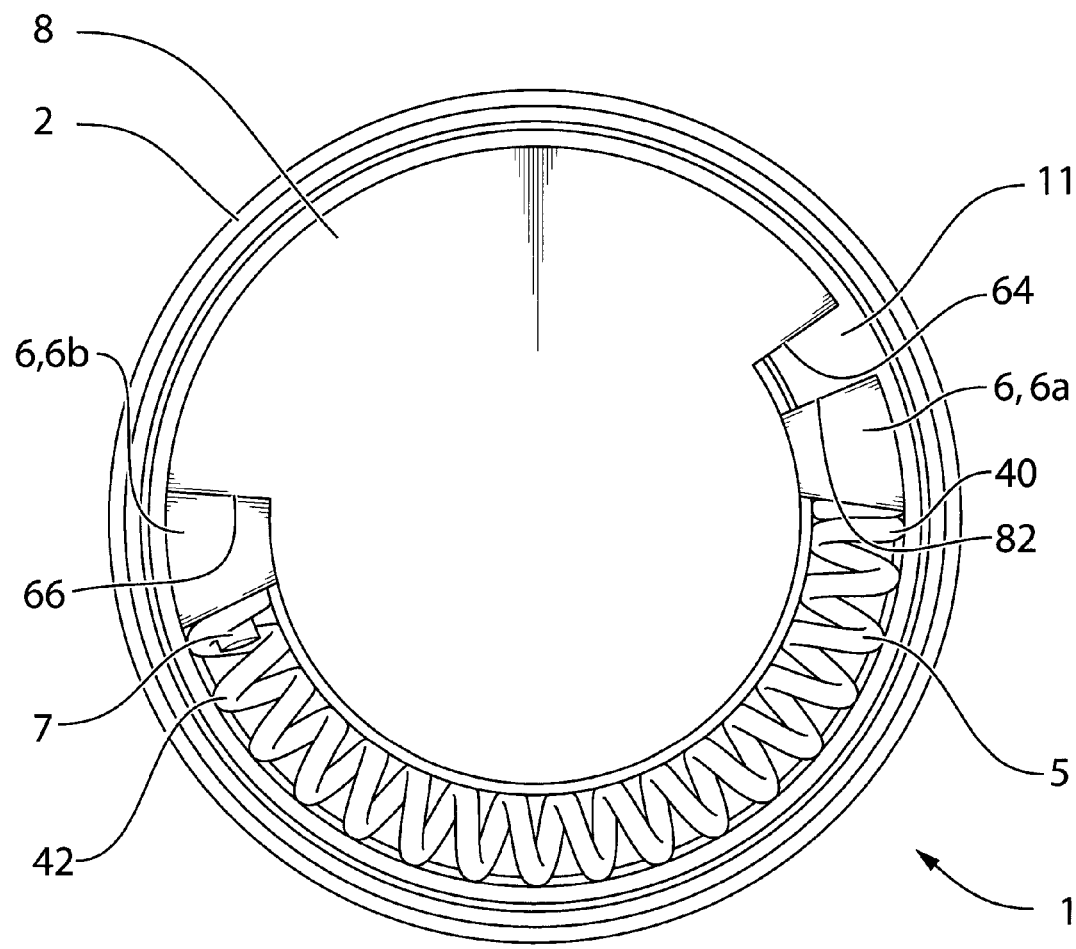
FIG. 28 is a front view of double acting spring system in the position when the pivotable driver transfers a load in the arrow direction opposite to FIG. 27, as a reference to the double acting functionality.

FIG. 25 shows the isolator 1 with the driver 8 thereon and with spacing S1. FIG. 26 shows the isolator 1 with the driver 8 removed so as to show the pulley drive surfaces and the spacing S2. FIG. 27 shows torque transfer from the shaft adapter 54 to the pulley 2. FIG. 28 shows torque transfer from the pulley 2 to the shaft adapter 54. The spacings S1 and S2 may have the same relationships as the spacings S1 and S2 in FIGS. 1a-11 and in FIGS. 12-23.

Figure 29:
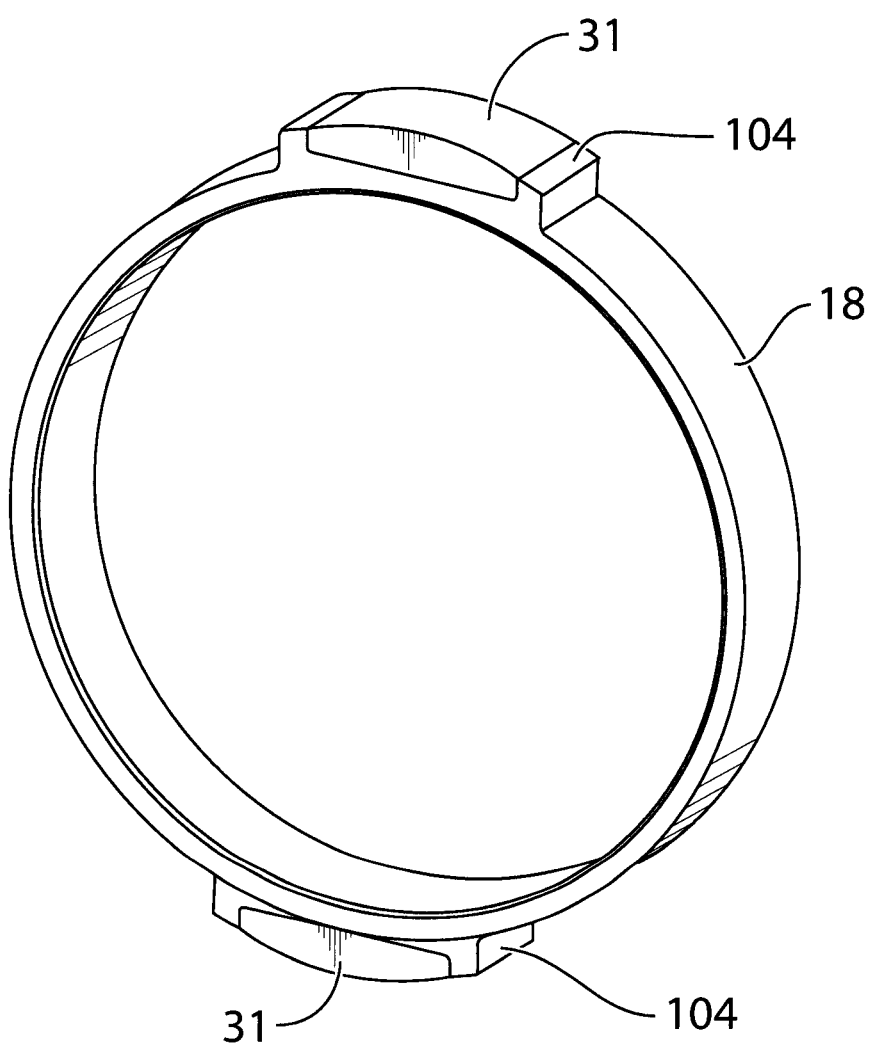
FIG. 29 is a perspective view of the support ring, as a variant with friction inserts.
Figure 30:
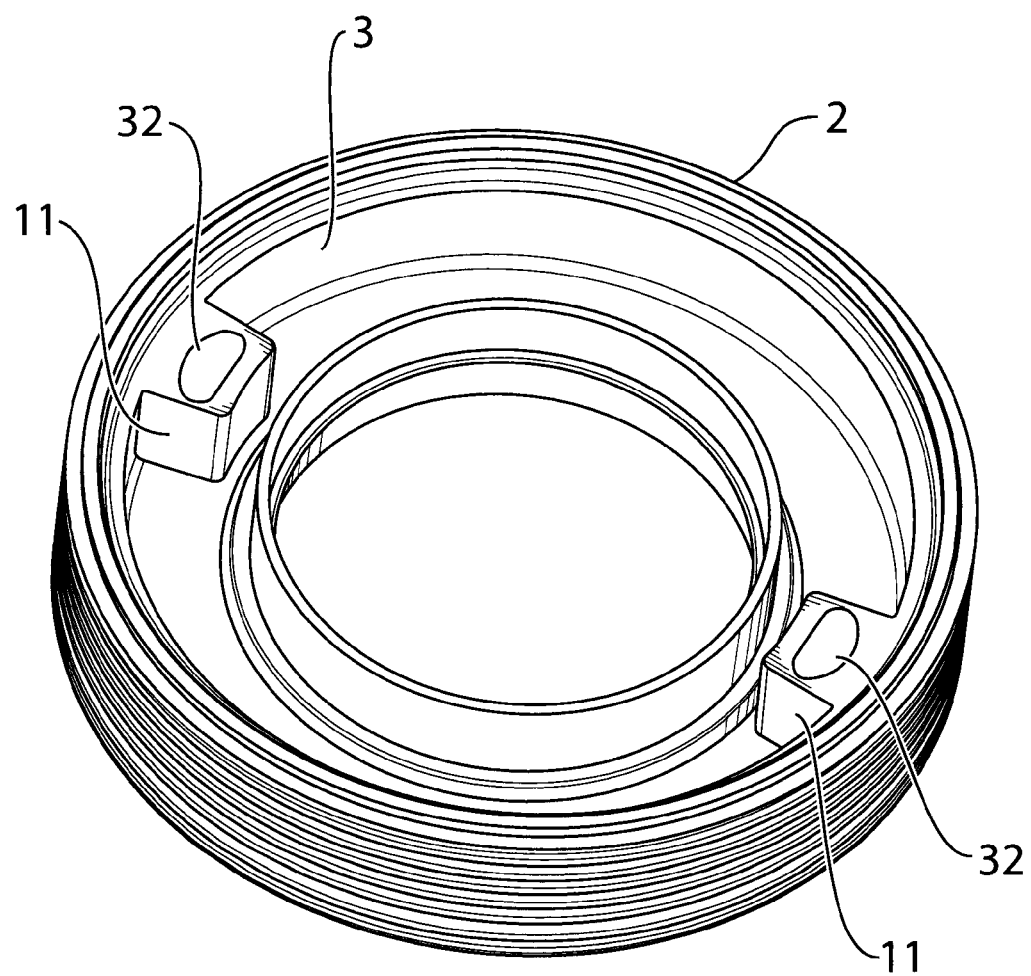
FIG. 30 is a perspective view of the pulley, as a variant where the travel stops of the spring support with friction inserts.

FIGS. 29 and 30 illustrate friction members 31 and 32 that could be used to provide damping of the movement of the pulley 2 relative to the shaft adapter 54, particularly during movement that is proximate the rest positions of the pulley 2 and shaft adapter 54 (e.g. as shown in FIGS. 4 and 15). The amount of damping provided would depend on the coefficient of friction between the friction members 31 and the associated surfaces of the projections 11 and on the force therebetween, or on the coefficient of friction between the friction members 32 and the associated surfaces of the arms 12 of the driver 8, and on the force therebetween. In the embodiment shown in FIG. 29, the friction member 31 is fixedly connected to the shaft adapter 54 (by virtue of being on the projections 102 which engage the gaps G between the skirts 102 of the driver 8), and is frictionally engageable with the pulley 2. In the embodiment shown in FIG. 30, the friction member 31 is fixedly connected to the pulley 2 (by virtue of being on the projections 11), and is frictionally engageable with the shaft adapter 54.

Figure 31:
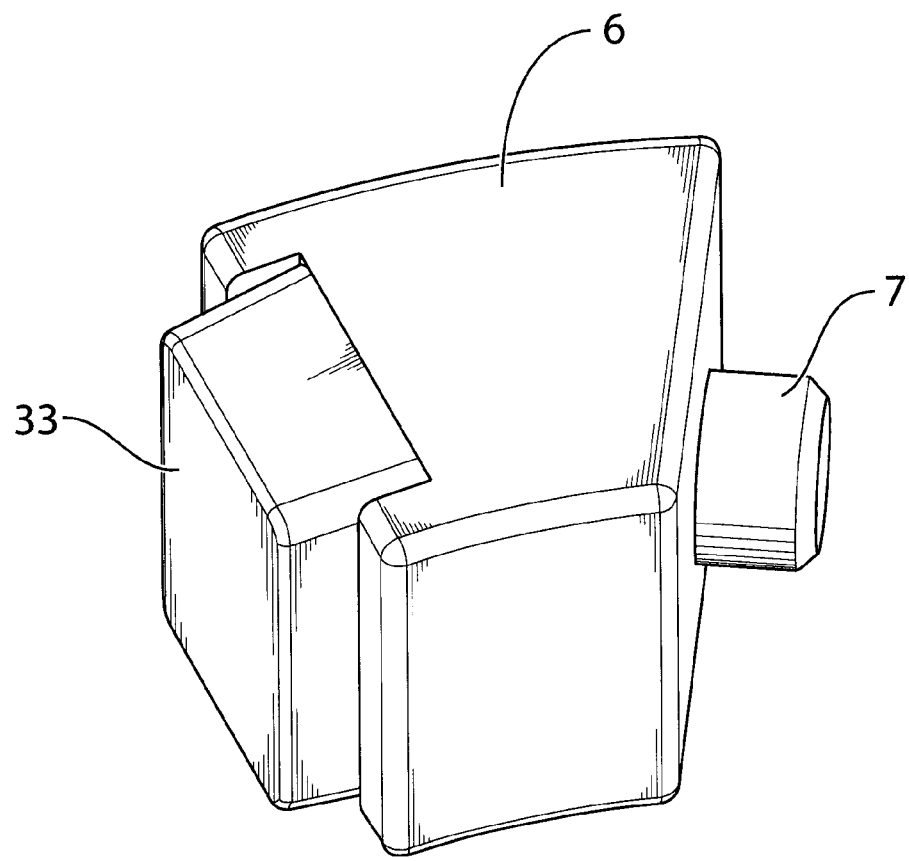
FIG. 31 is a perspective view of the guide, as a variant with the damping material insert.

FIG. 31 shows another optional element, which is a bumper shown at 33 that would be mounted in each of the end members 6. A first bumper 33 on the first end members 6a would be engaged with the first adapter drive surfaces 64 and 68 during torque transfer therewith, and would be engaged with the first pulley drive surfaces 82 and 86 during torque transfer therewith. A second bumper 33 on the second end members 6b would be engaged with the second adapter drive surfaces 66 and 70 during torque transfer therewith and that is engaged with the second pulley drive surfaces 84 and 88 during torque transfer therewith.

Throughout the figures, components are sometimes removed to better show components that would otherwise be obscured. For example, in FIGS. 4, 5 and 6 one of the springs 5 is removed to illustrate certain components more clearly.

While the above description constitutes a plurality of embodiments of the present invention, it will be appreciated that the present invention is susceptible to further modification and change without departing from the fair meaning of the accompanying claims.

The invention claimed is:

1. An isolator, comprising:
a spring having a first spring end and a second spring end;
a shaft adapter that is mountable to a crankshaft for rotation about an axis, wherein the shaft adapter has a first adapter drive surface that is engageable with the first spring end and a second adapter drive surface that is angularly spaced from the first adapter drive surface by an adapter drive surface spacing and that is engageable with the second spring end; and
a pulley that is engageable with an endless drive member and that is rotatable relative to the shaft adapter, wherein the pulley has a first pulley drive surface that is engageable with the first spring end and a second pulley drive surface that is angularly spaced from the first pulley drive surface by a pulley drive surface spacing and that is engageable with the second spring end,
wherein torque is transferable from the shaft adapter to the spring through the first spring end, and from the spring to the pulley through the second spring end,
wherein torque is transferable from the pulley to the spring through the first spring end, and from the spring to the shaft adapter through the second spring end,
wherein one of the adapter and pulley drive surface spacings is larger than the other of the adapter and pulley drive surface spacings,
wherein, when transitioning from torque transfer from the shaft adapter to the pulley to torque transfer from the pulley to the shaft adapter, the second adapter drive surface engages the second spring end at a different time than the first adapter drive surface disengages from the first spring end, and the second pulley drive surface disengages from the second spring end at a different time than the first pulley drive surface engages the first spring end,
and wherein when transitioning from torque transfer from the pulley to the shaft adapter to torque transfer from the shaft adapter to the pulley the first adapter drive surface engages the first spring end at a different time than the second adapter drive surface disengages from the second spring end, and the first pulley drive surface disengages from the first spring end at a different time than the second pulley drive surface engages the second spring end.

2. An isolator as claimed in claim 1, further comprising a first end member that is engaged with the first spring end and a second end member that is engaged with the second end of the spring, wherein the first pulley drive surface and first adapter drive surface are both engageable with the first spring end through the first end member and wherein the second pulley drive surface and second adapter drive surface are both engageable with the second spring end through the second end member.

3. An isolator as claimed in claim 2, further comprising a bushing, wherein the first and second end members each have a radially inner surface that is slideable on the bushing to permit movement one of the first and second end members relative to the bushing during relative movement between the shaft adapter and the pulley.

4. An isolator as claimed in claim 3, wherein each of the first and second end members has one of a projection and a recess, and the bushing has the other of a projection and a recess, wherein the projection extends into the recess and wherein the projection and recess extend circumferentially and radially, so as to lock the end members axially in position while permitting circumferential movement of the end members.

5. An isolator as claimed in claim 4, wherein the pulley includes an inner portion that is rotatably mounted to the shaft adapter, an outer portion that engages the endless drive member, a web that connects the inner and outer portions, and a cover member that partially encloses a spring chamber defined in part by the web and the outer portion, wherein the end members are constrained axially by the cover member and the web, and radially by the bushing and by the outer portion of the pulley, so as to permit travel along a circumferential path.

6. An isolator as claimed in claim 5, wherein the pulley includes a structural member and a lining member that lines the outer portion and the web of the pulley and that is positioned to directly face the spring.

7. An isolator as claimed in claim 2, further comprising a first bumper on the first end member that is engaged with the first adapter drive surface during torque transfer therewith and that is engaged with the first pulley drive surface during torque transfer therewith; and
a second bumper on the second end member that is engaged with the second adapter drive surface during torque transfer therewith and that is engaged with the second pulley drive surface during torque transfer therewith.

8. An isolator as claimed in claim 2, wherein one of the adapter and pulley drive surface spacings is larger than the other than the other of the adapter and pulley drive surface spacings by a spacing difference that is less than 5 degrees and greater than 0.5 degrees.

9. An isolator as claimed in claim 1, wherein the pulley is rotatably mounted to the hub via at least one bearing.

10. An isolator as claimed in claim 1, wherein the shaft adapter includes a hub that is mountable to a crankshaft of an engine, and a driver that is mountable to the hub.

11. An isolator as claimed in claim 1, wherein the pulley drive surface spacing is larger than the adapter drive surface spacing.

12. An isolator as claimed in claim 1, wherein the spring is a first spring and wherein the isolator further comprises a second spring having a first spring end and a second spring end,
wherein the first adapter drive surface is one of two first adapter drive surfaces that are engageable with the first spring ends of the two springs respectively and wherein the second adapter drive surface is one of two second adapter drive surfaces that are angularly spaced from the first adapter drive surfaces and that are engageable with the second spring ends of the two springs, and
wherein the first pulley drive surface is one of two first pulley drive surfaces that are engageable with the first spring ends of the two springs respectively and wherein the second pulley drive surface is one of two second pulley drive surfaces that is angularly spaced from the first pulley drive surfaces and that are engageable with the second spring ends of the two springs respectively.

13. An isolator as claimed in claim 12, wherein the two springs exhibit polar symmetry, the adapter drive surfaces exhibit polar symmetry, and the pulley drive surfaces exhibit polar symmetry.

14. An isolator as claimed in claim 1, wherein one of the adapter and pulley drive surface spacings is larger than the other than the other of the adapter and pulley drive surface spacings by a spacing difference that is selected based on a moment of inertia of the pulley and a moment of inertia of the shaft adapter.

15. An isolator as claimed in claim 14, wherein one of the adapter and pulley drive surface spacings is larger than the other than the other of the adapter and pulley drive surface spacings by a spacing difference that is selected based on a maximum torque to be transferred.

16. An isolator as claimed in claim 1, wherein the spring is an arcuate helical coil compression spring.

17. An isolator, comprising:
a spring having a first spring end and a second spring end;
a shaft adapter that is mountable to a crankshaft for rotation about an axis, wherein the shaft adapter has a first adapter drive surface that is engageable with the first spring end and a second adapter drive surface that is angularly spaced from the first adapter drive surface and that is engageable with the second spring end; and
a pulley that is engageable with an endless drive member and that is rotatable relative to the shaft adapter, wherein the pulley has a first pulley drive surface that is engageable with the first spring end and a second pulley drive surface that is angularly spaced from the first pulley drive surface and that is engageable with the second spring end, a friction member that is fixedly connected to one of the pulley and the shaft adapter and is frictionally engageable with the other of the pulley and the shaft adapter,
wherein torque is transferable from the shaft adapter to the spring through the first spring end, and from the spring to the pulley through the second spring end,
wherein torque is transferable from the pulley to the spring through the first spring end, and from the spring to the shaft adapter through the second spring end,
wherein, when the isolator is at rest, the adapter and pulley drive surfaces are configured have positions relative to one another that are selected based on a moment of inertia of the pulley and a moment of inertia of the shaft adapter, based on a maximum torque to be transferred therebetween, and based on a material of the adapter drive surfaces and a material of the pulley drive surfaces, such that when transitioning from torque transfer from the shaft adapter to the pulley to torque transfer from the pulley to the shaft adapter, the second adapter drive surface engages the second spring end with a first kinetic energy and at a different time than the first adapter drive surface disengages from the first spring end, and the second pulley drive surface disengages from the second spring end with a second kinetic energy and at a different time than the first pulley drive surface engages the first spring end, and such that when transitioning from torque transfer from the pulley to the shaft adapter to torque transfer from the shaft adapter to the pulley the first adapter drive surface engages the first spring end with a third kinetic energy and at a different time than the second adapter drive surface disengages from the second spring end, and the first pulley drive surface disengages from the first spring end with a fourth kinetic energy and at a different time than the second pulley drive surface engages the second spring end,
wherein the first, second, third and fourth kinetic energies are less than a selected value.

* * * * *